(12) United States Patent
Wang et al.

(10) Patent No.: US 12,348,920 B2
(45) Date of Patent: *Jul. 1, 2025

(54) ELECTRONIC COMPONENTS AND GLASSES

(71) Applicant: SHENZHEN SHOKZ CO., LTD., Guangdong (CN)

(72) Inventors: Yueqiang Wang, Shenzhen (CN); Yongjian Li, Shenzhen (CN); Yunbin Chen, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 228 days.

This patent is subject to a terminal disclaimer.

(21) Appl. No.: 18/297,905

(22) Filed: Apr. 10, 2023

(65) Prior Publication Data

US 2023/0247338 A1    Aug. 3, 2023

Related U.S. Application Data

(63) Continuation of application No. 17/646,865, filed on Jan. 3, 2022, now Pat. No. 11,627,399, which is a
(Continued)

(30) Foreign Application Priority Data

Aug. 24, 2018   (CN) .......................... 201810975514.7

(51) Int. Cl.
*H04R 1/08* (2006.01)
*G02C 11/00* (2006.01)
(Continued)

(52) U.S. Cl.
CPC ............. *H04R 1/083* (2013.01); *G02C 11/10* (2013.01); *H04R 1/04* (2013.01); *H04R 1/406* (2013.01);
(Continued)

(58) Field of Classification Search
CPC .......... H04R 1/083; H04R 1/04; H04R 1/406; H04R 1/46; H04R 3/005; H04R 2460/13; G02C 11/10
(Continued)

(56) References Cited

U.S. PATENT DOCUMENTS 6,069,963 A   5/2000 Martin et al.
9,720,258 B2   8/2017 Reyes
(Continued)

FOREIGN PATENT DOCUMENTS

CN         2876825 Y      3/2007
CN       205982890    *   2/2017
(Continued)

OTHER PUBLICATIONS

International Search Report in PCT/CN2019/102380 mailed on Oct. 30, 2019, 8 pages.
(Continued)

*Primary Examiner* — William A Jerez Lora
(74) *Attorney, Agent, or Firm* — METIS IP LLC

(57) ABSTRACT

The present disclosure relates to electronic components and glasses comprising an electronic component. The electronic component may include a component body, a first circuit board, a second circuit board, a first microphone element, and a second microphone element. The component body may include a cavity. The first circuit board and the second circuit board may be inclined to each arranged in the cavity. The first microphone element may be arranged on a sidewall, facing the component body, of the first circuit board. The second microphone element may be arranged on a sidewall, facing the component body, of the second circuit board. A first sound conducting hole may be arranged on a sidewall, opposite to the first microphone element, of the component body. The first sound conducting hole may be
(Continued)

configured to conduct a sound to the first microphone element. A second sound conducting hole may be arranged on the sidewall, opposite to the first microphone element, of the component body. The second sound conducting hole may be configured to conduct a sound to the second microphone element. The present disclosure may make full use of a space of the electronic component. When the electronic component is applied to an electronic device, it is beneficial to the thinness and lightness of the electronic device.

20 Claims, 23 Drawing Sheets

Related U.S. Application Data continuation of application No. 17/172,068, filed on Feb. 9, 2021, now Pat. No. 11,272,278, which is a continuation of application No. PCT/CN2019/102380, filed on Aug. 24, 2019.

(51) Int. Cl.
  *H04R 1/04*  (2006.01)
  *H04R 1/40*  (2006.01)
  *H04R 1/46*  (2006.01)
  *H04R 3/00*  (2006.01)

(52) U.S. Cl.
  CPC ............... *H04R 1/46* (2013.01); *H04R 3/005* (2013.01); *H04R 2460/13* (2013.01)

(58) Field of Classification Search
  USPC ..................................... 381/91, 92, 327, 381
  See application file for complete search history.

(56) References Cited

U.S. PATENT DOCUMENTS

| 10,699,691 | B1* | 6/2020 | Ye ................... G10K 11/17881 |
| 2009/0190026 | A1 | 7/2009 | Chen |
| 2010/0159755 | A1 | 6/2010 | Lin et al. |
| 2010/0272304 | A1* | 10/2010 | Thiel ..................... G02C 3/003 381/381 |
| 2014/0185003 | A1* | 7/2014 | Waters ................... G02C 11/04 351/158 |
| 2016/0112817 | A1 | 4/2016 | Fan et al. |
| 2016/0246076 | A1* | 8/2016 | Wei ........................ G02C 11/10 |
| 2018/0213072 | A1 | 7/2018 | Shi et al. |
| 2021/0027554 | A1 | 1/2021 | Leonov |
| 2021/0185423 | A1 | 6/2021 | Provost et al. |
| 2021/0211795 | A1 | 7/2021 | Wang et al. |
| 2021/0272578 | A1 | 9/2021 | Bacon |

FOREIGN PATENT DOCUMENTS

| CN | 205982890 U | 2/2017 |
| CN | 206301081 U | 7/2017 |
| CN | 207731040 U | 8/2018 |
| CN | 208783025 U | 4/2019 |
| CN | 208849971 U | 5/2019 |
| DE | 102012213304 A1 | 1/2014 |
| EP | 3273753 A1 | 1/2018 |

OTHER PUBLICATIONS

Written Opinion in PCT/CN2019/102380 mailed on Oct. 30, 2019, 12 pages.

* cited by examiner

ELECTRONIC COMPONENTS AND GLASSES

CROSS REFERENCE TO RELATED APPLICATIONS

This application is a continuation of U.S. application Ser. No. 17/646,865, filed on Jan. 3, 2022, which is a continuation of U.S. application Ser. No. 17/172,068 (issued as U.S. Pat. No. 11,272,278), filed on Feb. 9, 2021, which is a Continuation of International Application No. PCT/CN2019/102380, filed on Aug. 24, 2019, which claims priority of Chinese Patent Application No. 201810975514.7, filed on Aug. 24, 2018, the entire contents of each of which are incorporated herein by reference.

TECHNICAL FIELD

The present disclosure generally relates to a technical field of electronic devices, and more particular, to an electronic component and glasses including the electronic component.

BACKGROUND

With the development of technology, people have higher requirements for the versatility of electronic devices, products, or the like. When collecting voice signals, an electronic device with microphones may be susceptible to other noises, such as noises in the surrounding environment and sounds of other people's speeches. As a result, the microphones cannot receive pure voice signals. A dual-microphone technique is a noise reduction technique commonly used at present. By analyzing signals collected by a dual-microphone, the voice signals and an influence of other noises may be distinguished.

However, in general, the use of the dual-microphone requires the integration of more electronic components and more complex circuit structures in an electronic device, which needs to increase a space of the electronic device and is difficult to meet the requirements of lightness and thinness for the electronic device.

Therefore, it is necessary to provide an electronic component, an electronic device, and a method for installation and assembly of the electronic component and device, so that the electronic device can not only accommodate the electronic component (e.g., a dual-microphone) and other electronic components in a more efficient manner, but also meet the requirements of lightness and thinness.

SUMMARY

One aspect of the present disclosure provides an electronic component. The electronic component may include a component body, a first circuit board, a second circuit board, a first microphone element, and a second microphone element. The component body may include a cavity. The first circuit board and the second circuit board may be inclined to each arranged in the cavity. The first microphone element may be arranged on a sidewall, facing the component body, of the first circuit board. The second microphone element may be arranged on a sidewall, facing the component body, of the second circuit board. A first sound conducting hole may be arranged on a sidewall, opposite to the first microphone element, of the component body. The first sound conducting hole may be configured to conduct a sound to the first microphone element. A second sound conducting hole may be arranged on the sidewall, opposite to the first microphone element, of the component body. The second sound conducting hole may be configured to conduct a sound to the second microphone element.

In some embodiments, the component body may include a container body and a cover. The container body may be hollow to form the cavity. An opening in flow communication with the cavity may be arranged in the container body. The cover may be arranged on the opening and closes the cavity.

In some embodiments, the first circuit board may be arranged facing the cover. The first microphone element may be arranged on a side, facing the cover, of the first circuit board.

In some embodiments, the first sound conducting hole may be arranged on the cover.

In some embodiments, the first circuit board may be parallel or inclined to the cover. The first sound conducting hole may be vertical or inclined to a surface of the cover.

In some embodiments, a central axis of the first sound conducting hole may coincide with a main axis of a sound receiving area of the first microphone element.

In some embodiments, the second circuit board may be arranged facing the container body. The second microphone element may be arranged on a side, facing the container body, of the second circuit board.

In some embodiments, the second sound conducting hole may be arranged on a sidewall, opposite to the cover or the first sound conducting hole, of the container body.

In some embodiments, a central axis of the second sound conducting hole may coincide with a main axis of a sound receiving area of the second microphone element.

In some embodiments, the central axis of the second sound conducting hole may coincide with or be parallel to the central axis of the first sound conducting hole.

In some embodiments, the main axis of the sound receiving area of the second microphone element may coincide with or be parallel to the main axis of the sound receiving area of the first microphone element.

In some embodiments, the second microphone element may include a bone conductive microphone. The bone conductive microphone may extend out of the container body through the second sound conducting hole.

In some embodiments, the cover may include a hard bracket and a soft cover integrally molded on a surface of the hard bracket. The hard bracket may be configured to mechanically connect the container body. A microphone hole may be arranged on the hard bracket. The soft cover may cover the microphone hole. A first sound barrier may be arranged at a position, corresponding to the microphone hole, of the soft cover. The first sound barrier may extend toward the inside of the cavity through the microphone hole and define a sound conducting channel. One end of the sound conducting channel may be communicated with the first sound conducting hole. The first microphone element may be inserted into the sound conducting channel from other end of the sound conducting channel.

In some embodiments, a second sound barrier may be arranged at a position, corresponding to the second sound conducting hole, of the container body. The second sound barrier may extend toward the inside of the cavity through the second sound conducting hole to limit a transmission direction of a sound to the second microphone element.

In some embodiments, an area of the first circuit board may be smaller than an area of the second circuit board. The opening and the cover may be arranged in a corresponding strip shape. A size of the first circuit board along a width direction of the cover may be smaller than a size of the second circuit board in a vertical direction of the first circuit board.

In some embodiments, a switch and a light-emitting element may be arranged on the first circuit board at intervals.

In some embodiments, a main control chip and an antenna may be arranged on the second circuit board.

In some embodiments, the first circuit board and the second circuit board may be made of a flexible circuit board or a soft-hard combined double-layer circuit board. The flexible circuit board is bent in the cavity to form the first circuit board and the second circuit board. The soft-hard combined double-layer circuit board may include a flexible connection board and two hard circuit boards respectively connected to both ends of the flexible connection board. The two hard circuit boards may be inclined to each other to form the first circuit board and the second circuit board.

Another aspect of the present disclosure may provide an electronic device. The electronic device may include a glasses bracket. The glasses bracket may include a glasses frame and two temples. A temple may include a temple body connected to the glasses frame. At least one of temple bodies of the two temples may include an electronic component. A container body may be at least a part of the temple body.

In some embodiments, the glasses temple may further include a connector that is hinged with, through a hinge, an end of the temple body away from the glasses frame. The glasses may further include a bone conductive loudspeaker. The bone conductive loudspeaker may be arranged on the connector. The connector may be configured to switch the bone conductive loudspeaker, relative to the temple body, between a first position and a second position, and attach the bone conductive loudspeaker on a back of an auricle of a user when the bone conductive loudspeaker is in the first position.

BRIEF DESCRIPTION OF THE DRAWINGS

The present disclosure is further illustrated in terms of exemplary embodiments. These exemplary embodiments are described in detail with reference to the drawings. The embodiments are not restrictive. In the embodiments, the same number represents the same structure, wherein.

DETAILED DESCRIPTION

Figure 1:
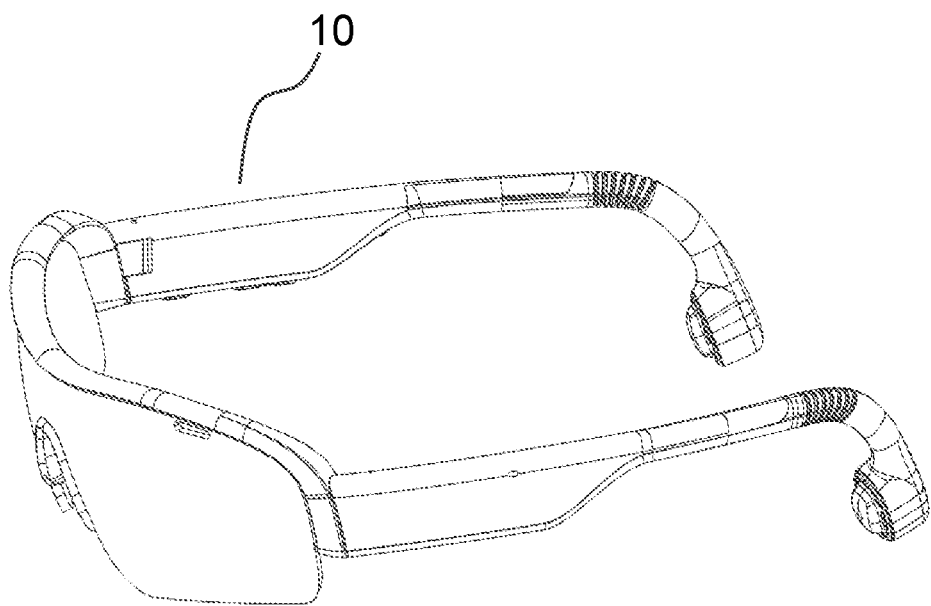
FIG. 1 is a schematic diagram illustrating an overall structure of an electronic component according to some embodiments of the present disclosure.

In order to describe the technical solutions of the embodiments of the present disclosure more clearly, a brief introduction of the drawings referred to in the description of the embodiments is provided below. Obviously, the drawings in the following description are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure or operation.

As used in the disclosure and the appended claims, the singular forms "a," "an," and "the" include plural referents unless the content clearly dictates otherwise. In general, the terms "comprises," "comprising," "includes," and/or "including" only indicate that the steps and units that have been clearly identified are included, the steps and units do not constitute an exclusive list, and the method or device may also include other steps or units.

An electronic component in the present disclosure may be applied to an electronic device. The electronic device may include any electronic device that needs to seal the internal structure, such as a mobile phone, a tablet computer, glasses with circuit components, electronic devices, etc., which may not be limited herein.

Figure 2:
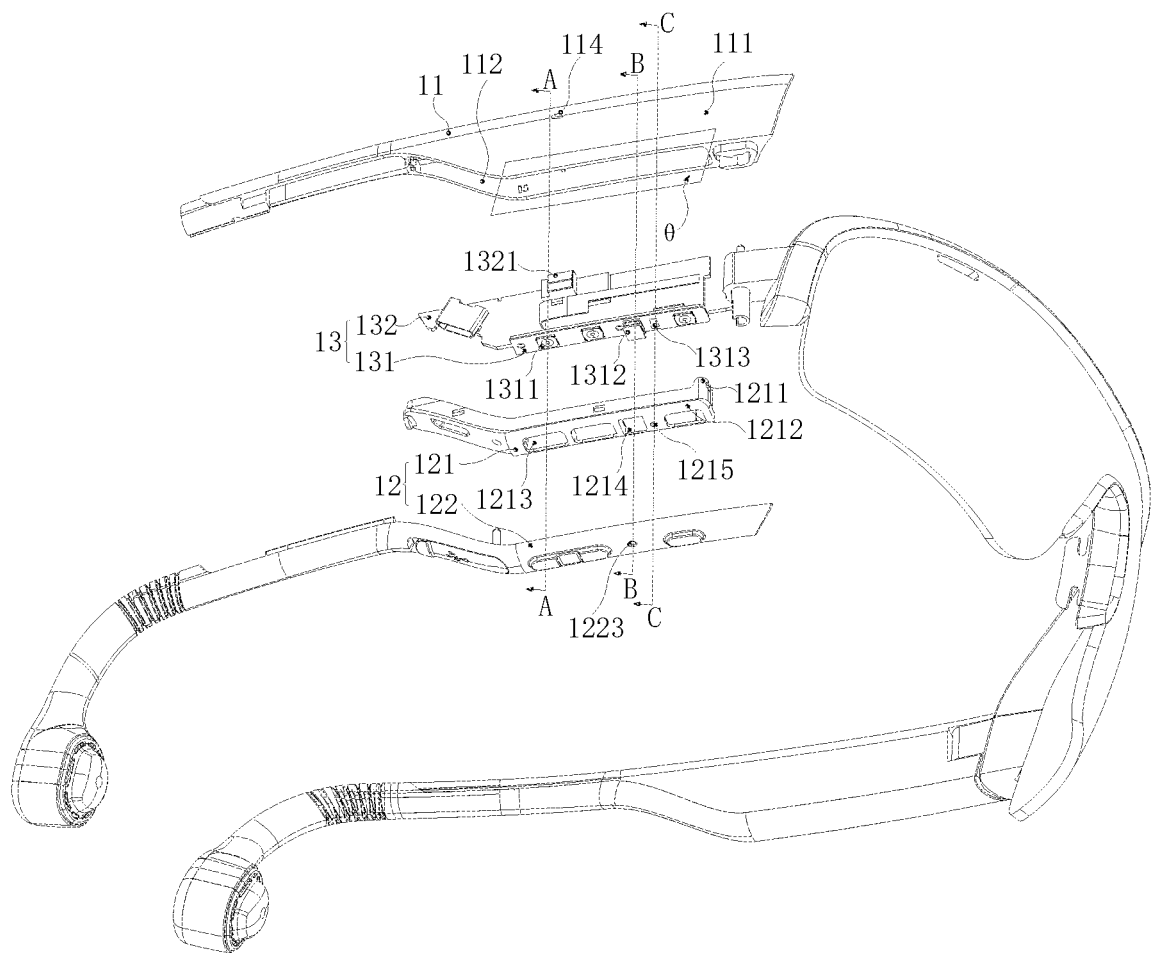
FIG. 2 is a schematic diagram illustrating an exemplary exploded structure of an electronic component according to some embodiments of the present disclosure.
Figure 3:
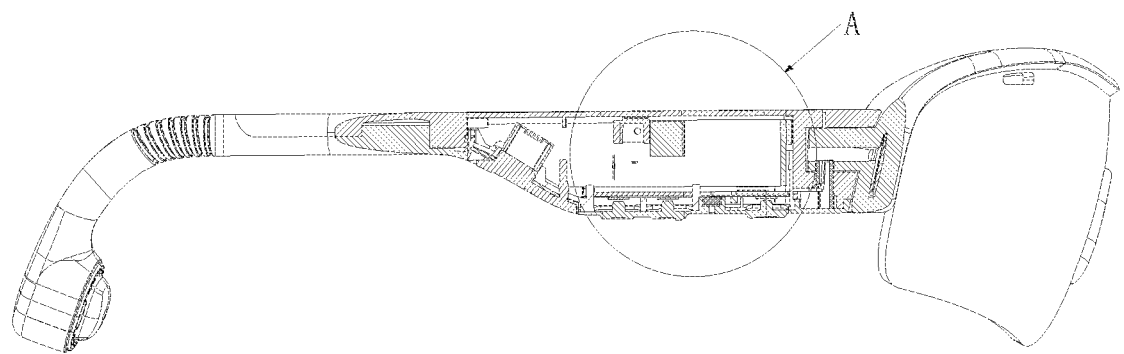
FIG. 3 is a schematic diagram illustrating an exemplary partial cross-sectional view of an electronic component according to some embodiments of the present disclosure.
Figure 4:
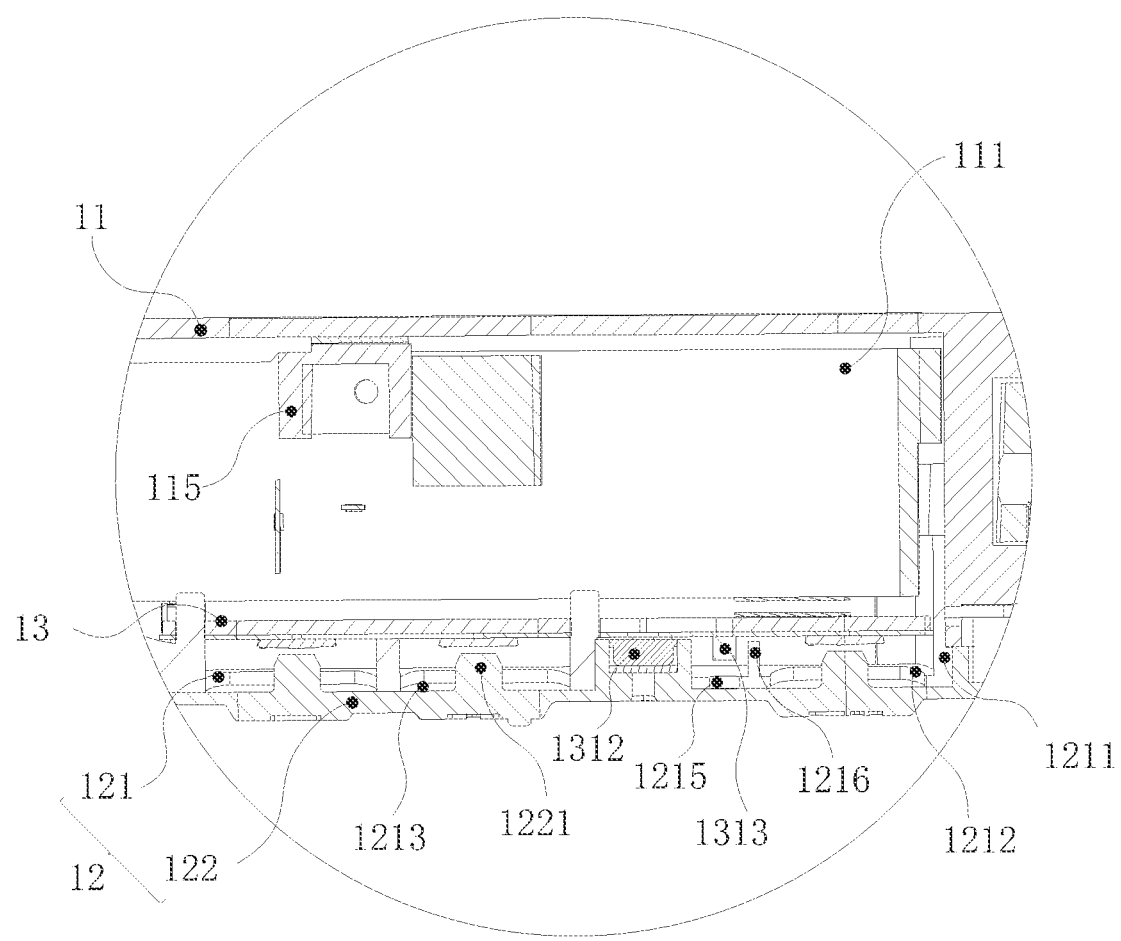
FIG. 4 is a schematic diagram illustrating an exemplary enlarged view of part A in FIG. 3 according to some embodiments of the present disclosure.

FIG. 1 is a schematic diagram illustrating an overall structure of an electronic component according to some embodiments of the present disclosure. FIG. 2 is a schematic diagram illustrating an exemplary exploded structure of an electronic component according to some embodiments of the present disclosure. FIG. 3 is a schematic diagram illustrating an exemplary partial cross-sectional view of an electronic component according to some embodiments of the present disclosure. FIG. 4 is a schematic diagram illustrating an exemplary enlarged view of part A in FIG. 3 according to some embodiments of the present disclosure. As shown in FIGS. 1-4, the electronic component may include a component body 10. A cavity 111 may be formed inside the component body. As used herein, the electronic component may include any electronic devices that meet different application scenarios or requirements, which may not be limited herein.

The component body 10 may be a structure formed by combining at least two parts or a structure manufactured by an integral molding technique, for example, a structure integrally formed by an integral injection process. A spatial shape of the component body 10 may include a cuboid, a cube, an ellipsoid, a sphere, a cone, and other irregular spatial shapes. A material of the component body 10 may include plastic, silica gel, rubber, plastic, glass, ceramic, alloy, stainless steel, or the like, or any combination thereof.

The component body 10 may include a container body 11 and a cover 12. The container body 11 may be hollow to form a cavity 111. An opening 112 communicating with the cavity 111 may be arranged in the container body 11. The cover 12 may be arranged on the opening 112 and close the cavity 111. The cavity 111 may be an internal cavity formed by two or more components when assembled together or an internal cavity formed according to a shape of the molding during an integral molding process of the component. The cavity 111 may be configured to accommodate a plurality of electronic elements and circuit structures of the electronic component. The component body 10 may be configured to seal the cavity 111. The cavity 111 may be completely sealed by the component body 10 or jointly sealed by the component body 10 and other accessories on the component body 10.

The container body 11 may be at least a part of an electronic device.

Specifically, the container body 11 in the above embodiments may be a structure for accommodating, for example, circuit boards, batteries, and electronic elements in the electronic device. For example, the container body 11 may be a whole or a part of a housing of the electronic device.

In addition, the container body 11 may be provided with the cavity 111 having the opening 112 for accommodating the circuit boards, the batteries, the electronic elements, or the like. The opening 112 may be in flow communication with the cavity and serve as a mounting and dismounting passage of the circuit boards, the batteries, the electronic elements, or the like. Specifically, a count (or number) of the opening 112 may be one or multiple, which may not be limited herein.

A shape of the cover 12 may be at least partially matched with the opening 112, so that the cover 12 may be arranged on the opening 112 to seal the cavity 111. A material of the cover 12 may be different from or at least partly the same as the container body 11.

In some embodiments, the cover 12 may include a hard bracket 121 and a soft cover 122. The hard bracket 121 may be configured to mechanically connect with the container body 11. The soft cover 122 may be integrally injection molded on a surface of the hard bracket 121 to seal the cavity 111 after the hard bracket 121 is connected to the container body 11.

Specifically, a material of the hard bracket 121 may be a hard plastic. A material of the soft cover 122 may be a soft silica gel, a rubber, or the like. A shape of the hard bracket 121 facing the container body 11 may match or conform a shape of the opening 112 and be fixed to the opening 112 of the cavity 111 by inserting, buckling, etc., so as to be mechanically connected to the container body 11. However, a gap that is easily formed at a connection region between the hard bracket 121 and the container body 11 may reduce sealing performance of the cavity 111. Further, the soft cover 122 may be integrally injection molded to be formed on an outer surface of the hard bracket 121 away from the container body 11, and further cover the connection region between the hard bracket 121 and the container body 11, so as to realize the sealing of the cavity 111.

In the above embodiments, the cover 12 may include the hard bracket 121 and the soft cover 122 that are integrally injected on the surface of the hard bracket 121. The hard bracket 121 may be mechanically connected to the container body 11. The soft cover 122 may further seal the cavity 111 after the hard bracket 121 is connected to the container body 11. The soft cover 122 may be more conducive to fit the gap between the hard bracket 121 and the container body 11 to further improve the sealing of the electronic component, thereby improving the waterproof effect of the electronic component. And the hard bracket 121 and the soft cover 122 may be integrally molded, which can simplify the assembly process of the electronic component.

In some embodiments, the hard bracket 121 may include an insertion portion 1211 and a covering portion 1212. The covering portion 1212 may be arranged on the opening 112. The insertion portion 1211 may be arranged on one side of the covering portion 1212 and extend into the cavity 111 along an inner wall of the cavity 111 to fix the covering portion 1212 on the opening 112.

In some embodiments, the insertion portion 1211 may not be inserted through the inner wall of the cavity 111. For example, the cavity 111 may be provided with a plug-in portion matching a shape of the insertion portion 1211 of the hard bracket 121, so that the insertion portion 1211 may be inserted into the plug-in portion and fix the insertion portion 1211 in the cavity 111. For example, the shape of the insertion portion 1211 may be a cylinder and the plug-in portion may be a circular ring that may wrap or surround the cylindrical insertion portion 1211. An inner diameter of the plug-in portion of the circular ring may be appropriately smaller than an outer diameter of the cylindrical insertion portion 1211, so that when inserted into the plug-in portion, the insertion portion 1211 and the plug-in portion may have an interference fit and the hard bracket 121 can be stably connected to the cavity 111. Certainly, other plug-in manners may also be used, as long as the insertion portion 1211 may be inserted into the cavity 111 and fixed with the cavity 111.

Specifically, the covering portion 1212 may be arranged on a side of the insertion portion 1211 away from the cavity 111 and cover the opening 112 after the insertion portion 1211 is inserted into the cavity 111. The covering portion 1212 may be a complete structure, or some holes may be further arranged thereon to achieve certain functions.

Figure 5:
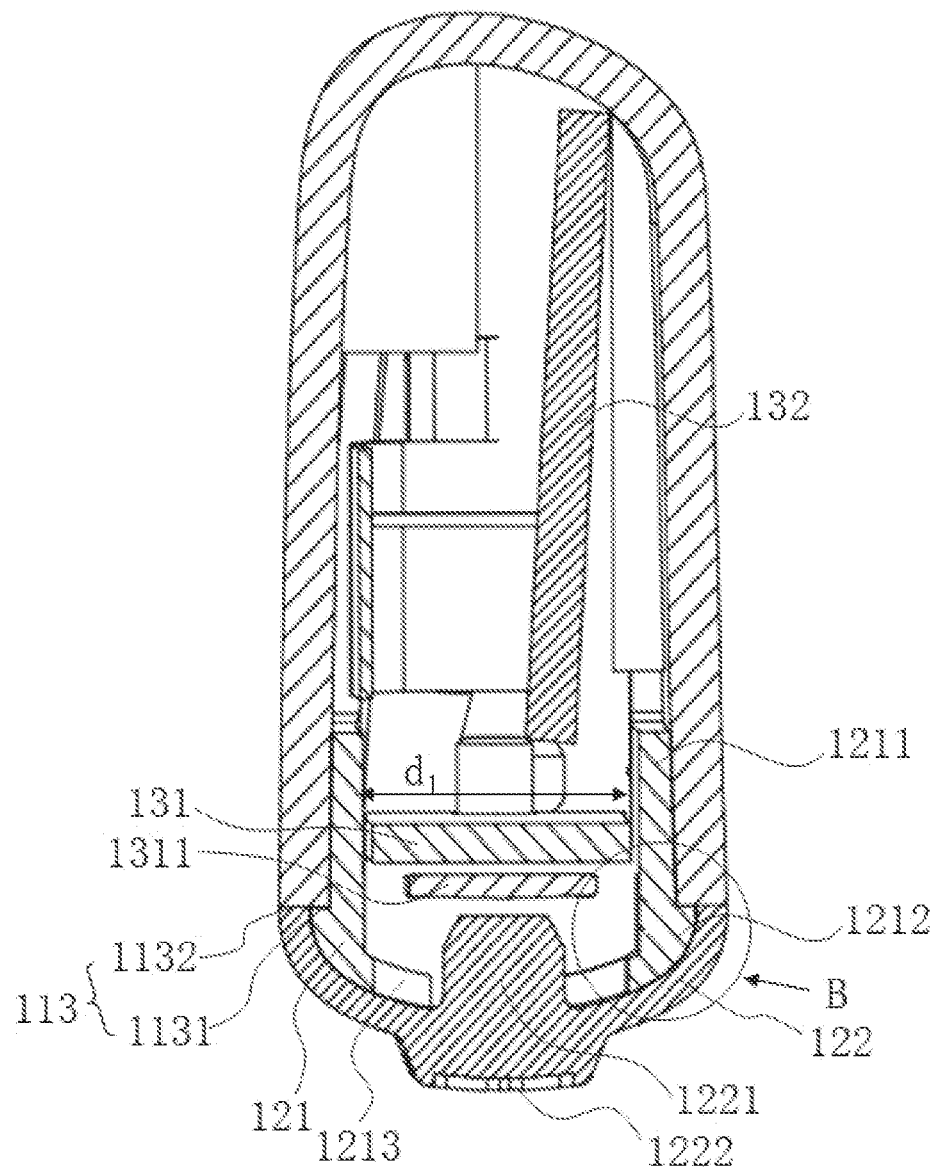
FIG. 5 is a schematic diagram illustrating an exemplary cross-sectional view of an electronic component in an assembled state along A-A axis in FIG. 2 according to some embodiments of the present disclosure.

Referring to FIG. 5, FIG. 5 is a schematic diagram illustrating an exemplary cross-sectional view of the electronic component in an assembled state along A-A axis in FIG. 2 according to some embodiments of the present disclosure. In some embodiments, the container body 11 may include an opening edge 113 configured to define the opening 112. The covering portion 1212 may be pressed on an inner region 1131, close to the opening 112, of the opening edge 113. The soft cover 122 may cover an outer surface, away from the container body 11, of the covering portion 1212 and be pressed on an outer region 1132 that is located at the periphery of the inner region 1131 of the opening edge 113, so as to achieve a seal with the opening edge 113.

The inner region 1131 and the outer region 1132 of the opening edge 113 may both belong to the opening edge 113 and may not be other regions other than the opening edge 113. The inner region 1131 of the opening edge 113 may be a region of the opening edge 113 close to the opening 112. The outer region 1132 of the opening edge 113 may be a region of the opening edge 113 away from the opening 112.

In some embodiments, the covering portion 1212 of the hard bracket 121 may be pressed on the inner region 1131 of the opening edge 113 close to the opening 112, so that the covering portion 1212 may initially seal the opening edge 113 first. However, due to the container body 11 and the hard bracket 121 are made of hard materials, the connection between the container body 11 and the hard bracket 121 and the further covering of the covering portion 1212 may not achieve a better sealing effect. A gap may be likely to occur between the opening edge 113 and an end of the covering portion 1212 that is pressed on the opening edge 113 and away from the opening 112. The gap may further penetrate the cavity 111, thereby reducing sealing performance. Therefore, in some embodiments, the soft cover 122 may cover an outer surface of the covering portion 1212 away from the container body 11 and be further pressed on the outer region 1132 that is located at the periphery of the inner region 1131 of the opening edge 113, so that the gap between the covering portion 1212 of the hard bracket 121 and the opening edge 113 may be further covered. Due to the soft cover 122 is made of a soft material, the sealing and waterproof effect of the electronic component may be further improved.

Figure 6:
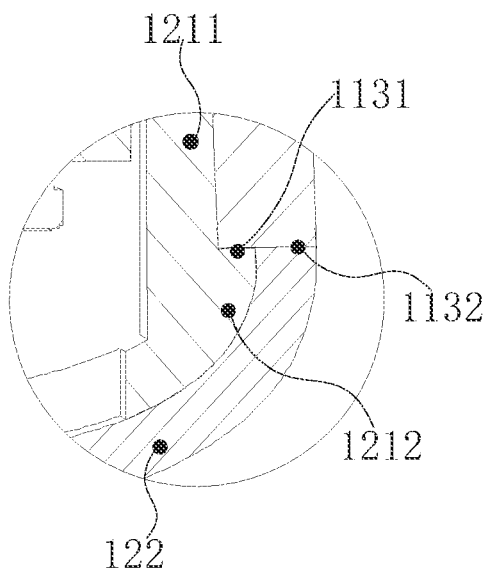
FIG. 6 is a schematic diagram illustrating an exemplary enlarged view of part B in FIG. 5 according to some embodiments of the present disclosure.

Referring to FIG. 6, FIG. 6 is a schematic diagram illustrating an exemplary enlarged view of part B in FIG. 5 according to some embodiments of the present disclosure. In some embodiments, when the cover 12 is buckled, the periphery of the cover 1212 may cover the inner region 1131 of the opening edge 113 and contact with the inner region 1131 of the opening edge 113. The soft cover 122 may be arranged on a side of the covering portion 1212 away from the container body 11, so that the covering portion 1212 located in the inner region 1131 of the opening edge 113 may be clamped between the inner region 1131 of the opening edge 113 and the soft cover 122. The soft cover 122 may further extend in a direction of the covering portion 1212 away from the opening 112 and toward a direction of the opening edge 113 until the soft cover 122 contacts with the outer region 1132 of the opening edge 113, so that a contact end surface of the covering portion 1212 and the opening edge 113 and a contact end surface of the soft cover 122 and the opening edge 113 are arranged flush with each other, thereby forming a structure of "the opening edge 113—the cover 1212—the soft cover 122" on the inner region 1131 of the opening edge 113.

Figure 7:
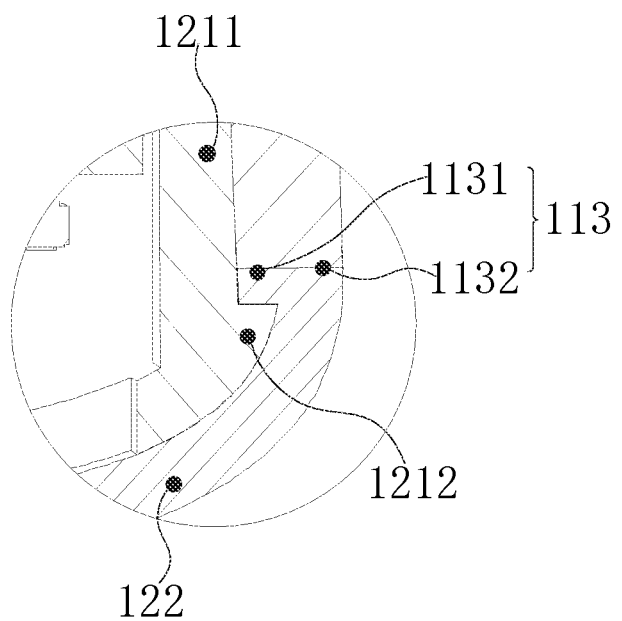
FIG. 7 is a schematic diagram illustrating an exemplary partial cross-sectional view of an electronic component according to some embodiments of the present disclosure.

In another application scenario, referring to FIG. 7, FIG. 7 is a schematic diagram illustrating an exemplary partial cross-sectional view of an electronic component according to some embodiments of the present disclosure. In the application scenario, after extending to contact the outer region 1132 of the opening edge 113, the soft cover 122 may further extend along a region between the covering portion 1212 and the opening edge 113 to the inner region 1131 of the opening edge 113. Assuming that between the inner region 1131 of the opening edge 113 and the covering portion 1212, the covering portion 1212 may be pressed on the inner region 1131 of the opening edge 113 to form a structure of "the opening edge 113—the soft cover 122—the covering portion 1212—the soft cover 122." In the application scenario, on a basis of covering the covering portion 1212 of the hard bracket 121, the soft cover 122 may further extend between the hard bracket 121 and the opening edge 113, thereby further improving the sealing effect between the cavity 111 and the cover 12, and the waterproof effect of the electronic component.

In some embodiments, referring to FIGS. 1-7, the electronic component may further include a circuit component 13 arranged in the cavity 111. A switch 1311 may be arranged on the circuit component 13.

Specifically, the circuit component 13 may include a first circuit board 131. The switch 1311 may be arranged on an outer side of the first circuit board 131 facing the opening 112 of the cavity 111. A count (or number) of switches may be one or multiple. When the count of switches is multiple, the switches may be arranged on the first circuit board 131 at intervals.

Correspondingly, a switch hole 1213 corresponding to the switch 1311 may be arranged on the hard bracket 121. The soft cover 122 may further cover the switch hole 1213. A pressing portion 1221 may be arranged at a position corresponding to the switch hole 1213. The pressing portion 1221 may extend toward inside of the cavity 111 through the switch hole 1213. When a position corresponding to the soft cover 122 is pressed, the pressing portion 1221 may press the switch 1311 on the circuit component 13 to trigger the circuit component 13 to execute a preset function.

The pressing portion 1221 arranged on the soft cover 122 may be formed by a side, facing the bracket 121, of the soft cover 122 protruding toward the switch hole 1213 and the switch 1311. A shape of the pressing portion 1221 may match or conform the switch hole 1213, so that when the position corresponding to the soft cover 122 is pressed, the pressing portion 1221 may pass through the switch hole 1213 to the corresponding switch 1311 on the first circuit board 131. A length of the pressing portion 1221 in a direction toward the switch 1311 may be set so that the switch 1311 is not pressed when the position corresponding to the soft cover 122 is not pressed, but is pressed by the pressing portion 1221 when the position corresponding to the soft cover 122 is pressed.

In some embodiments, a position on the soft cover 122 corresponding to the pressing portion 1221 may further protrude toward a side away from the hard bracket 121 to form a pressing portion 1222 with a convex, so that a user may determine a position of the switch 1311 and trigger the circuit component 13 to execute the corresponding function by pressing the corresponding pressing portion 1222.

In some embodiments, the electronic component may include one or more microphone components. Further, the electronic component may include a dual-microphone component. The dual-microphone component may include a first microphone component and a second microphone component. The first microphone component may be arranged at a position closer to a main sound source (e.g., t human mouth). The second microphone component may be arranged at a position away from the main sound source. The first microphone component may include a first microphone element and a circuit board on which the first microphone element is mounted. The second microphone component may include a second microphone element and a circuit board on which the second microphone element is mounted. In some embodiments, the first microphone component and the second microphone component may be distributed in the electronic component in a specific way, so that the main sound source (e.g., the human mouth) may be located in a direction of the second microphone element pointing to the first microphone element.

When a user wears the electronic component, due to a distance of the human mouth (the main sound source) relative to the first microphone component and the second microphone component is closer than a distance of other sound sources (e.g., noise sources) in environment relative to the first microphone component and the second microphone component, the human mouth may be considered as a near-field sound source of the first microphone component and the second microphone component. For a near-field sound source, a volume of a sound received by a microphone component may be related to a distance between the microphone component and the sound source. Due to the first microphone component is closer to the main sound source, the first microphone component may receive an audio signal $V_{j1}$ with a larger volume. Due to the second microphone component is farther from the main sound source, the second microphone component may receive an audio signal $V_{j2}$ with a smaller volume, i.e., $V_{j1} > V_{j2}$.

Due to noise sources in the environment are far away from the first microphone component and the second microphone component, a noise source may be considered as a far-field sound source of the first microphone component and the second microphone component. For a far-field sound source, noise signals received by the first microphone component and the second microphone component may be similar in magnitude, i.e., $V_{Y1} \approx V_{Y2}$.

Therefore, a total sound signal received by the first microphone component may be $V_1 = V_{j1} + V_{Y1}$ and a total sound signal received by the second microphone component may be $V_2 = V_{j2} = V_{Y2}$. In order to eliminate noises in the received sound signal, a difference processing may be performed between the total sound signal of the first microphone component and the total sound signal of the second microphone component. The difference processing may be denoted as Equation (1) as follows:

$$V = V_2 - (V_{j1} - V_{j2}) + (V_{Y1} - V_{Y2}) \approx V_{j1} - V_{j2} \qquad (1).$$

Further, according to a difference result obtained by Equation (1), combined with distances of the first microphone component and the second microphone component relative to the main sound source, an audio signal actually obtained, from the main sound source, by the first microphone component and/or the second microphone component may be further obtained, i.e., $V_{j1}$ or $V_{j2}$.

Therefore, in order to ensure the quality of the audio signal finally obtained, the difference result obtained in Equation (1) should be made as large as possible, i.e., $V_{j1} >> V_{j2}$. In some embodiments of the present disclosure, the above effect may be achieved in the following manners including making an installation position of the first microphone component as close as possible to the main sound source (e.g., a human mouth); making an installation position of the second microphone component as far away as possible from the main sound source (e.g., the human mouth); isolating spaces of two microphone components; setting a sound barrier between the two microphone components. It should be noted that all the manners mentioned above may achieve the effect of improving the quality of the audio signal and the manners may be used alone or in combination.

In some embodiments, in order to make the installation position of the first microphone component as close as possible to the main sound source (e.g., the human mouth), a first circuit board 131 on which the first microphone element 1312 is installed may be arranged to extend along a first direction. In order to make the installation position of the second microphone component as far away as possible from the main sound source (e.g., the human mouth), a second circuit board 132 on which the second microphone element 1321 is installed may be arranged to extend along a second direction. The first direction and the second direction may be flexibly adjusted to meet the required installation positions of the first circuit board 131 and the second circuit board 132. For example, the first direction and the second direction may be perpendicular to each other or inclined at any angle. And corresponding sound conducting channels and sound barriers may be set in an installation area of each microphone component. For the descriptions for the specific installations may be found in FIGS. 8-10 and the descriptions thereof.

Figure 8:
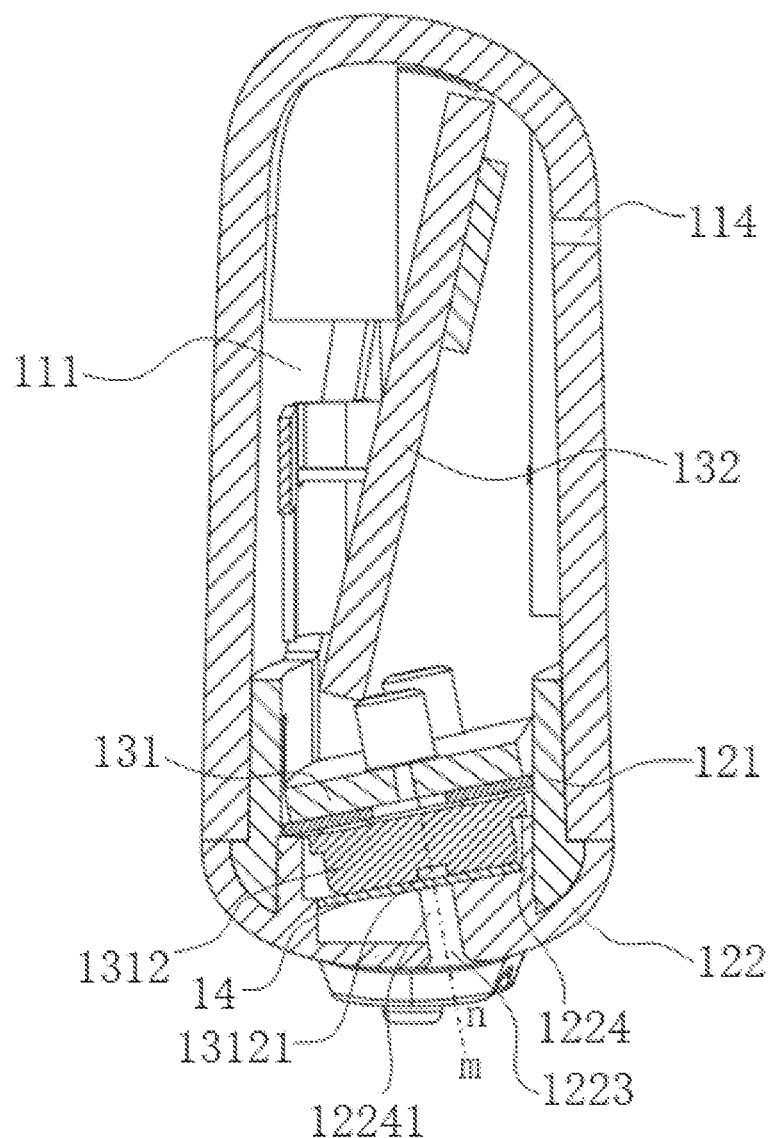
FIG. 8 is a schematic diagram illustrating an exemplary cross-sectional view of an electronic component in an assembled state along B-B axis in FIG. 2 according to some embodiments of the present disclosure.
Figure 9:
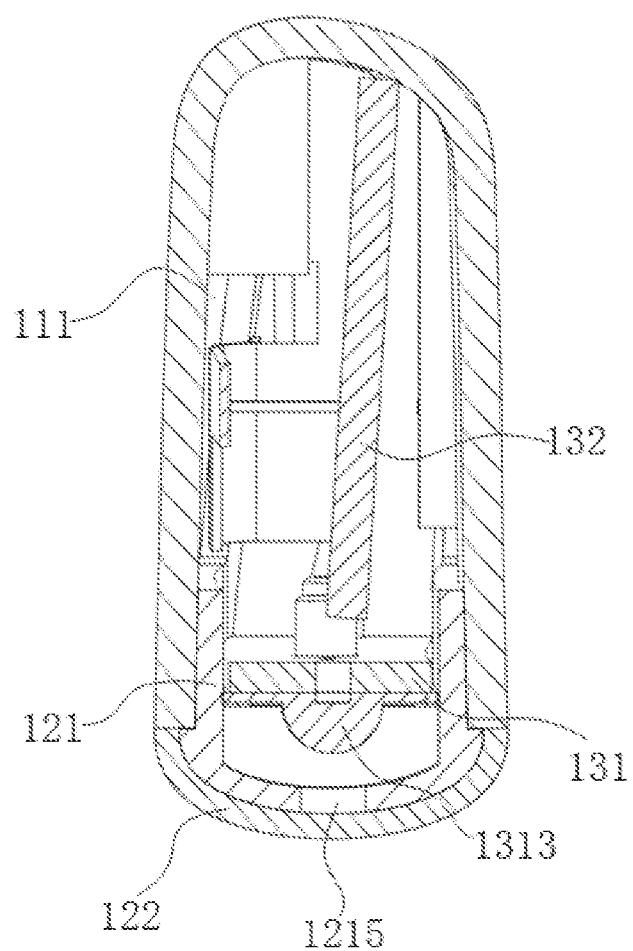
FIG. 9 is a schematic diagram illustrating an electronic component having a first circuit board and a second circuit board with a different angle from that of FIG. 8 according to some embodiments of the present disclosure.

In some embodiments, referring to FIG. 8 and FIG. 9, FIG. 8 is a schematic diagram illustrating an exemplary cross-sectional view of the electronic component in an assembled state along B-B axis in FIG. 2 according to some embodiments of the present disclosure; and FIG. 9 is a schematic diagram of an electronic component having a first circuit board and a second circuit board with a different angle from that of FIG. 8 according to some embodiments of the present disclosure. The first circuit board 131 may include a first microphone element 1312. Specifically, the first circuit board 131 may be arranged facing the cover 12. The first microphone element 1312 may be arranged on a side of the first circuit board 131 facing the cover 12. For example, the first microphone element 1312 and the switch 1311 in the above embodiments may be arranged on the first circuit board 131 at intervals. Specifically, the first microphone element 1312 may be configured to receive a sound signal from outside of the electronic component and convert the sound signal into an electrical signal for analysis and processing.

Correspondingly, a microphone hole 1214 corresponding to the first microphone element 1312 may be arranged on the hard bracket 121. A first sound conducting hole 1223 corresponding to the microphone hole 1214 may be arranged on the soft cover 122. The first sound conducting hole 1223 and the first microphone element 1312 may be arranged correspondingly.

Specifically, the first sound conducting hole 1223 may be arranged on the cover 12. One end of the first sound conducting hole 1223 may be connected to the microphone hole 1214 on the cover 12 and other end of the first sound conducting hole 1223 may face the first microphone element 1312, so that a sound conducting distance may be shortened and a sound conducting effect may be improved.

Specifically, the first circuit board 131 may face the cover 12 in a manner parallel or inclined to the cover 12. The first sound conducting hole 1223 may be perpendicular or inclined to a surface of the cover 12.

In some embodiments, a depth direction of the opening 112 may be vertical or inclined with respect to a bottom of the container body 11. When the opening 112 is vertical, the cover 12 may be horizontal with respect to the container body 11 after being closed. When the opening 112 is inclined, the closed cover 12 may be inclined with respect to the container body 11. The inclination of the closed cover 12 with respect to the container body 11 may be toward a side of the mouth of a human body, which can make the first sound conducting hole 1223 face the human mouth or the human face more directly, thereby improving the effect of the microphone component in collecting sounds of the main sound source.

Further, when the opening 112 is inclined, an angle between a plane of the opening 112 and a plane of the container body in a width direction may be in a range of 10°-30°, so that the first sound conducting hole 1223 further faces a mouth area of the human. Specifically, when the opening 112 is inclined, the angle between the plane of the opening 112 and the plane of the container body in the width direction may be any angle within the above range, such as 10°, 15°, 20°, 23°, 27°, 30°, etc., which may not be limited herein.

Specifically, the first sound conducting hole 1223 may be a through hole disposed on the soft cover 122. When the opening 112 is vertical and the first circuit board 131 is parallel to the cover 12, the first sound conducting hole 1223 may be perpendicular to the cover 12, that is, the first sound conducting hole 1223 may be vertical. When the opening 112 is vertical and the first circuit board 131 is inclined to the cover 12, the first sound conducting hole 1223 may be inclined to the cover 12, that is, the first sound conducting hole 1223 may be inclined. When the opening 112 is inclined and the first circuit board 131 is parallel to the cover 12, the first sound conducting hole 1223 may be perpendicular to the cover 12, that is, the first sound conducting hole 1223 may be inclined. When the opening 112 is inclined and the first circuit board 131 is inclined to the cover 12, the first sound conducting hole 1223 may also be inclined to the cover 12, that is, the first sound conducting hole 1223 may be vertical or inclined.

Further, when the first circuit board 131 faces the cover 12 and inclines to the cover 12, an angle between the first circuit board 131 and a plane that the cover 12 is located may be in a range of 5°-20°. Specifically, when the first circuit board 131 faces the cover 12 and inclines to the cover 12, the angle between the first circuit board 131 and the plane that the cover 12 is located may be any angle within the above range, such as 5°, 8°, 10°, 15°, 20°, etc., which may not be limited herein.

Specifically, the first sound conducting hole 1223 may correspond to the microphone hole 1214 on the bracket 121 and further connect the first microphone element 1312 with outside of the electronic component, so that sounds outside the electronic component may be received by the first microphone element 1312 through the first sound conducting hole 1223 and the microphone hole 1214.

In order to further improve sound conducting effect, a central axis of the first sound conducting hole 1223 may coincide with a main axis of a sound receiving area 13121 of the first microphone element 1312. The sound receiving area 13121 of the first microphone element 1312 refers to an area (e.g., a diaphragm) on the first microphone element 1312 that receives sound waves. When the central axis of the first sound conducting hole 1223 coincides with the main axis of the sound receiving area 13121 of the first microphone element 1312, after being collected by the microphone hole 1214, sounds of the main sound source may be directly conducted to the sound receiving area 13121 of the first microphone element 1312 through the first sound conducting hole 1223 which further reduces a sound propagation route, avoids loss and echo caused by repeated propagation of the sounds of the main sound source in the cavity, and prevents the sounds of the main sound source from being transmitted to an area that the second microphone element 1321 is located through a channel in the cavity, thereby improving sound effect.

In some embodiments, the cover 12 may be arranged in a strip shape. A main axis of the first sound conducting hole 1223 and the main axis of the sound receiving area 13121 of the first microphone element 1312 may be coincided in a width direction of the cover 12. The main axis of the sound receiving area 13121 of the first microphone element 1312 refers to a main axis of the sound receiving area 13121 of the first microphone element 1312 in the width direction of the cover 12, such as an axis n in FIG. 8. The main axis of the first sound conducting hole 1223 may be an axis m in FIG. 8. The axis n and the axis m may coincide with each other.

A shape of the first sound conducting hole 1223 may be any shape as long as it may input sounds from outside of the electronic component. In some embodiments, the first sound conducting hole 1223 may be a circular hole with a smaller size that is less than a certain threshold and arranged in an area of the cover 12 corresponding to the microphone hole 1214. The first sound conducting hole 1223 with the smaller size may reduce communication between the first microphone element 1312 in the electronic component and the outside of the electronic component, thereby improving the sealing of the electronic component.

Further, in order to conduct sound signal entering through the first sound conducting hole 1223 to the first microphone element 1312, a sound conducting channel 12241 may be set in a curved shape.

Specifically, in some embodiments, the main axis of the first sound conducting hole 1223 may be arranged in the middle of the cover 12 in the width direction of the cover 12.

In some embodiments, a first sound barrier 1224 may be arranged at a position of the soft cover 122 corresponding to the microphone hole. The first sound barrier 1224 may extend toward the inside of the cavity 111 through the microphone hole 1214 and define the sound conducting channel 12241. One end of the sound conducting channel 12241 communicates with the first sound conducting hole 1223 on the soft cover 122. The first microphone element 1312 may be inserted into the sound conducting channel 12241 from other end of the sound conducting channel 12241.

When the electronic component includes the switch 1311, the switch hole 1213 and the microphone hole 1214 may be arranged on the hard bracket 121 at intervals.

In some embodiments, a separation distance between the switch hole 1213 and the microphone hole 1214 may be 10-20 mm, or may be 10 mm, 15 mm, 20 mm, etc.

In some embodiments, the first sound barrier 1224 may extend from the soft cover 122, through the periphery of the first sound conducting hole 1223 and the microphone hole 1214, and into the cavity 111 to the periphery of the first microphone element 1312, thereby forming the sound conducting channel 12241 from the first sound conducting hole 1223 to the first microphone element 1312, so that sound signals of the electronic component entering the sound conducting hole may directly reach the first microphone element 1312 through the sound conducting channel 12241.

In some embodiments, a shape of the sound conducting channel 12241 on a section perpendicular to a length direction of the sound conducting channel 12241 may be consistent or not consistent with a shape of the microphone hole 1214 or the first microphone element 1312. In some embodiments, sectional shapes of the microphone hole 1214 and the first microphone element 1312 in a direction perpendicular to the hard bracket 121 toward the cavity 111 may be both square. A size of the microphone hole 1214 may be slightly larger than a peripheral dimension of the sound conducting channel 12241. An internal dimension of the sound conducting channel 12241 may be not smaller than a peripheral dimension of the first microphone element 1312. Accordingly, the sound conducting channel 12241 may pass through the first sound conducting hole 1223 to the first microphone element 1312 and wrap around the first microphone element 1312.

In the above manner, the soft cover 122 of the electronic component may be provided with the first sound conducting hole 1223 and the sound conducting channel 12241 that passes through the microphone hole 1214 from the periphery of the first sound conducting hole 1223 to reach the first microphone element 1312 and is wrapped in the periphery of the first microphone element 1312. The sound conducting channel 12241 may be arranged so that the sound signal entering from the first sound conducting hole 1223 can reach the first microphone element 1312 through the first sound conducting hole 1223 and be received by the first microphone element 1312, thereby reducing leakage of the sound signal in a propagation process, and improving the efficiency of the electronic component in receiving the sound signal.

In some embodiments, the electronic component may include a waterproof fabric 14 arranged in the sound conducting channel 12241. The waterproof fabric 14 may be butted, by the first microphone element 1312, against a side of the soft cover 122 facing the microphone element and cover the first sound conducting hole 1223.

In some embodiments, the hard bracket 121 in the sound conducting channel 12241 close to the first microphone element 1312 may protrude to form a convex surface opposite to the first microphone element 1312, such that the waterproof fabric 14 may be sandwiched between the first microphone element 1312 and the convex surface or directly bonded to the periphery of the first microphone element 1312. The specific setting manner of the waterproof fabric 14 may not be limited herein.

In addition to the waterproof effect of the first microphone element 1312, the waterproof fabric 14 may have functions such as sound transmission, which may avoid adversely affecting the sound receiving effect of the sound receiving area 13121 of the first microphone element 1312.

It should be noted that, due to the need of the circuit component 13 itself, the first microphone element 1312 may be arranged at a first position of the first circuit board 131. When the first sound conducting hole 1223 is arranged, the first sound conducting hole 1223 may be arranged at a second position of the cover 12 due to requirements such as beauty, convenience, etc. In some embodiments, the first position and the second position may not correspond to each other in a width direction of the cover 12, so that the main axis of the first sound conducting hole 1223 and the main axis of the sound receiving area 13121 of the first microphone element 1312 may be spaced from each other in the width direction of the cover 12, and the sound input through the first sound conducting hole 1223 may not be able to reach the sound receiving area 13121 of the first microphone element 1312 along a straight line.

In some embodiments, the cover 12 may be a part of the housing of the electronic device. In order to meet an overall aesthetic requirement of the electronic device, the first sound conducting hole 1223 may be arranged in the middle of the cover 12 in the width direction, such that the first sound conducting hole 1223 looks more symmetrical and meets the visual requirements of people.

In some embodiments, the corresponding sound conducting channel 12241 may be set to have a stair shape along the cross-section along B-B axis in FIG. 1, such that the sound signal introduced by the first sound conducting hole 1223 may be transmitted to the first microphone element 1312 through the stair-shaped sound conducting channel 12241 and be received by the first microphone element 1312.

Figure 10:
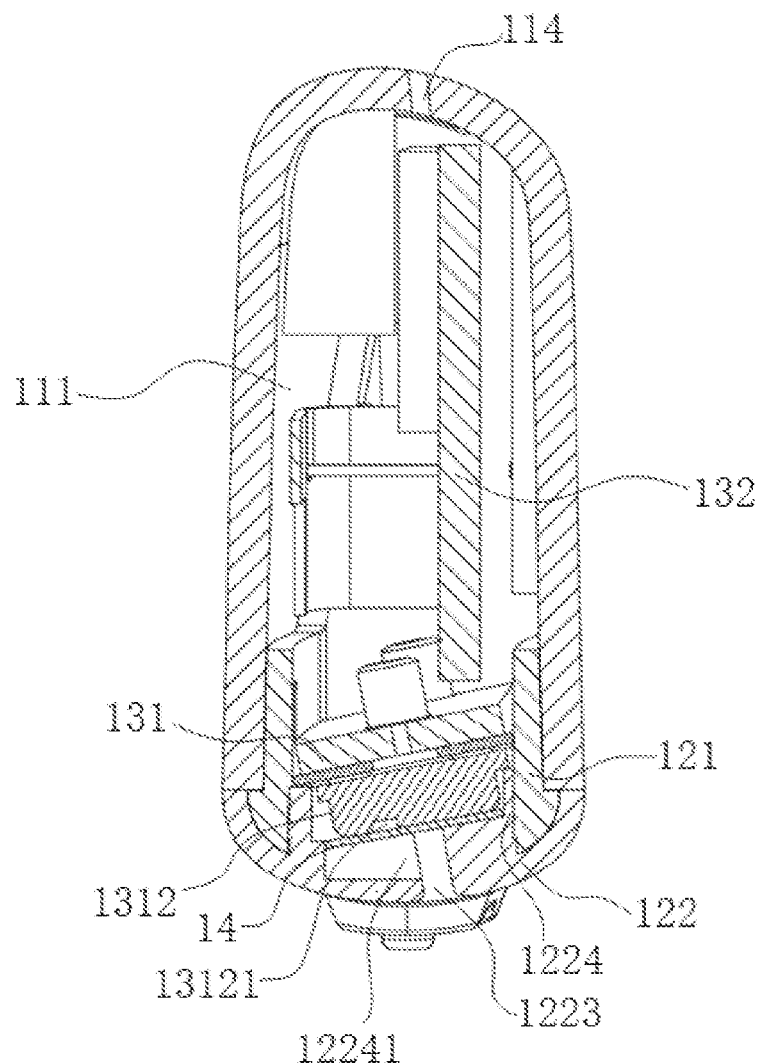
FIG. 10 is a schematic diagram illustrating an exemplary cross-sectional view of an electronic component in an assembled state along C-C axis in FIG. 2 according to some embodiments of the present disclosure.

In some embodiments, referring to FIG. 10, FIG. 10 is a schematic diagram illustrating an exemplary cross-sectional view of the electronic component in an assembled state along C-C axis in FIG. 2 according to some embodiments of the present disclosure. In some embodiments, the electronic component may include a light-emitting element 1313. Specifically, the light-emitting element 1313 may be arranged on the first circuit board 131 of the circuit component 13 to be accommodated in the cavity 111. For example, the light-emitting element 1313 may be arranged on the first circuit board 131 in a certain arrangement together with the switch 1311 and the first microphone element 1312.

In some embodiments, a light outlet 1215 corresponding to the light-emitting element 1313 may be arranged on the hard bracket 121. The soft cover 122 may cover the light outlet 1215. The thickness of an area of the soft cover 122 corresponding to the light outlet 1215 may be set to allow lights generated by the light-emitting element 1313 to be transmitted through the soft cover 122.

The light-emitting element 1313 may include a light-emitting diode, etc. In some embodiments, the electronic component may include one or more light-emitting elements. A count of the light-emitting elements may be one or multiple. In some embodiments, the electronic component may include one or more light outlets. A count of the light outlets on the hard bracket 121 may be the same as the count of the light-emitting elements. When the count of the light-emitting elements is multiple, the light-emitting elements may correspond to different light outlets, so that different signals may be transmitted through different light-emitting elements.

In some embodiments, the soft cover 122 can still transmit lights emitted by the light-emitting element 1313 to the outside of the electronic component by a certain mean while covering the light outlet 1215.

Specifically, in some embodiments, the thickness of the soft cover 122 corresponding to an entire area or a part of an area of the light outlet 1215 may be less than the thickness of the soft cover 122 corresponding to an outer region of the light outlet 1215, such that the lights emitted by the light-emitting element 1313 may pass through the light outlet 1215 and be further transmitted through the soft cover 122. Of course, other manners may also be used to enable the area where the soft cover 122 covers the light outlet 1215 to transmit the lights, which is not specifically limited herein. For example, a window may be arranged on the soft cover 122 corresponding to the entire area or the part of the area of the light outlet 1215. The window may be covered with a layer of a transparent or light-transmitting material (e.g., thin-film, quartz, etc.), such that the lights emitted by the light-emitting element 1313 may pass through the light outlet 1215 and be further transmitted through the window.

In some embodiments, on the basis of covering the light outlet 1215 corresponding to the light-emitting element 1313, the soft cover 122 may be set to enable the lights emitted by the light-emitting element 1313 to be transmitted from the soft cover 122 to the outside of the electronic component. Therefore, the light-emitting element 1313 may be sealed by the soft cover 122 without affecting the light-emitting function of the electronic component, so as to improve the sealing performance and waterproof performance of the electronic component.

Specifically, in some embodiments, the hard bracket 121 may be provided with a light-blocking component 1216 extending toward the inside of the cavity 111 on the periphery of the light outlet 1215. The light-blocking component 1216 may limit a transmission direction of the lights generated by the light-emitting element 1313.

The light outlet 1215 may have any shape that may transmit the lights emitted by the light-emitting element 1313, such as a circle, a square, a triangle, etc. In some embodiments, the shape of the light outlet 1215 may be a circle.

Due to a certain distance exists between the light-emitting element 1313 and the light outlet 1215, if no restriction is set, a part of the lights emitted by the light-emitting element 1313 may leak before reaching the light outlet 1215, so that the lights may not be effectively propagated to the light outlet 1215, thereby reducing a brightness of the lights visible from the outside of the electronic component and making it inconvenient for a user to receive signals. The arrangement of the light-blocking component 1216 in the embodiment may limit the transmission direction of the lights generated by the light-emitting element 1313, so as to reduce light leakage, thereby increasing the brightness of the light transmitted through the light outlet 1215.

Specifically, in some embodiments, the light-blocking component 1216 may be partially or completely formed by the hard bracket 121. For example, the hard bracket 121 may extend along the periphery of the light outlet 1215 toward the inside of the cavity 111 and surround the light-emitting element 1313, so that a light channel for light propagation may be formed. Through the light channel, the lights generated by the light-emitting element 1313 may be directly transmitted to the light outlet 1215 along an arrangement direction of the light channel. In some embodiments, the hard bracket 121 may not form the light channel, but only restrict the propagation of lights from one direction or several directions. For example, the hard bracket 121 may extend into the cavity 111 from only one side of the light outlet 1215 to form the light-blocking component 1216 that shields the light-emitting element 1313 on one side. In some embodiments, the light-blocking component 1216 may cooperate with other components to limit the propagation of lights. For example, the hard bracket 121 may extend into the cavity 111 from one side of the light exiting hole 1215 to form the light-blocking component 1216 that shields the light-emitting element 1313 on one side. The light blocking-component 1216 may cooperate with an inner wall of the cavity 111 or other structures of the hard bracket 121 to limit the transmission direction of the lights generated by the light-emitting element 1313 from multiple directions.

In some embodiments, the light-emitting element 1313 and the first microphone element 1312 may be adjacently arranged on the first circuit board 131. The light outlet 1215 corresponding to the light-emitting element 1313 and the microphone hole 1214 corresponding to the first microphone element 1312 may be arranged on the hard bracket 121 at intervals. As described in the above embodiments, the first sound barrier 1224 formed by the soft cover 122 defining the sound conducting channel 12241 may be arranged on the periphery of the first microphone element 1312. The first sound barrier 1224 may be arranged through the microphone hole 1214, such that the first microphone element 1312 and the light-emitting element 1313, the microphone hole 1214 and the light outlet 1215 are spaced.

Specifically, the light-blocking component 1216 formed by the hard bracket 121 may cooperate with a sidewall of the first sound barrier 1224 close to the light-emitting element 1313. The light-blocking component 1216 and the sidewall of the first sound barrier 1224 may jointly limit the transmission direction of the lights generated by the light-emitting element 1313.

In some embodiments, the cavity 111 may be arranged in a strip shape on a section perpendicular to a direction of the opening 112. Correspondingly, the hard bracket 121 may be in a strip shape and inserted into the cavity 111 from the opening 112 through the insertion portion 1211, thereby forming a mechanical connection with the cavity 111. The insertion portion 1211 may be arranged on both sides of the hard bracket 121 along a length direction of the hard bracket 121, such that the light-emitting element 1313 may be provided with the corresponding insertion portion 1211 of the hard bracket 121 on both sides of the hard bracket 121 along the length direction of the hard bracket 121 to limit the lights on both sides of the light-emitting element 1313. In some embodiments, the light-blocking component 1216 may be arranged on a side of the light-emitting element 1313 perpendicular to the length direction of the hard bracket 121. A sidewall of the first sound barrier 1224 may be arranged on the other side of the light-emitting element 1313 perpendicular to the length direction of the hard bracket 121. The sidewall of the first sound barrier 1224 and the other side of the light-emitting element 1313 may be parallel plates and further limit the transmission direction of the lights generated by the light-emitting element 1313 together with the insertion portion 1211 on both sides of the light-emitting element 1313.

In some embodiments, the circuit component 13 in the electronic component may include the first circuit board 131 in the above embodiments and the second circuit board 132. More descriptions regarding the first circuit board 131 and the second circuit board 132 may be found in FIG. 2, FIG. 5, FIG. 8, and FIG. 9.

Specifically, the second circuit board 132 may be arranged facing the container body 11. The second circuit board 132 may be arranged in the cavity 111 and inclined to the first circuit board 131. A second microphone element may be arranged on a side of the second circuit board 132 facing the container body 11.

The second microphone element 1321 may be arranged facing a sidewall of the container body 11, such that there is a relatively large space near the second microphone element 1321 and it is convenient to provide functional components corresponding to the second microphone element 1321 on the container body 11. In some embodiments, the second circuit board 132 may be arranged inclined to the first circuit board 131. Functional components on the two circuit boards may be arranged in a misaligned manner, which may reduce distances between the functional components and further save and compress internal space of the electronic component.

The second sound conducting hole 114 may be arranged on the sidewall of the container body 11 opposite to the cover 12 or the first sound conducting hole 1223.

The second sound conducting hole 114 corresponding to the container body 11 may be arranged on the sidewall of the container body 11. The second sound conducting hole 114 and the first sound conducting hole 1223 may be away from each other. In some embodiments, the opening 112 of the container body 11 may be an inclined opening. The cover 12 may be inclined with respect to the container body 11. The sidewall of the container body 11 opposite to the first sound conducting hole 1223 may be a sidewall of the cavity 111. The second sound conducting hole 114 may be arranged on the sidewall of the container body 11 within a range of 3-6 millimeters from the top of the container body 11. In some embodiments, the distance between the second sound conducting hole 114 and the top of the container body 11 may be 3 millimeters, or 4 millimeters, or 5 millimeters, or 6 millimeters, etc.

In some embodiments, when a depth direction of the opening 112 of the container body 11 is vertical with respect to the bottom of the container body, the cover 12 may be horizontal with respect to the container body 11. The sidewall of the container body 11 opposite to the first sound conducting hole 1223 may be the top of the cavity 111. The second sound conducting hole 114 may be arranged on the top of the container body 11. Further, the second sound conducting hole 114 may be arranged at a middle position of the top of the container body 11.

The above arrangement can keep the second sound conducting hole 114 away from the main sound source, reduce the sound of the main sound source received by the second sound conducting hole 114, increase a proportion of environmental noise received by the second sound conducting hole 114, and enhance noise reduction effect.

As described in the above embodiments of the electronic component of the present disclosure, the first sound conducting hole 1223 corresponding to the first microphone element 1312 and the microphone hole 1214 may be arranged on the cover 12. The first microphone element 1312 may be configured to receive sounds input through the sound conducting hole 1223. The second microphone element 1321 may be configured to receive sounds input through the second sound conducting hole 114.

In some embodiments, a central axis of the second sound conducting hole 114 may coincide with a main axis of a sound receiving area of the second microphone element 1321.

When the central axis of the second sound conducting hole 114 coincides with the main axis of the sound receiving area of the second microphone element 1321, noises may be directly conducted to the sound receiving area of the second microphone element 1321 through the second sound conducting hole 114, which reduces a propagation of noises inside the cavity 111. The noises may be directly conducted to the sound receiving area 13121 of the first microphone element 1312 through the first sound conducting hole 1223. The noises received by the first microphone element 1312 and the noise received by the second microphone element 1321 may be approximately the same, which facilitates the elimination of noises in subsequent processing and improves the quality of the main sound source.

In some embodiments, the central axis of the second sound conducting hole 114 may be coincident with or parallel to the central axis of the first sound conducting hole 1223.

The second sound conducting hole 114 and the first sound conducting hole 1223 may have the same central axis direction, that is, the central axes of the second sound conducting hole 114 and the first sound conducting hole 1223 may coincide or be parallel. In some embodiments, a sound entrance of the second sound conducting hole 114 and a sound entrance of the first sound conducting hole 1223 face opposite directions, which reduces the main sound source received by the second sound conducting hole 114 and is beneficial to eliminate the noises in subsequent processing and improve the quality of the main sound source.

In some embodiments, the main axis of the sound receiving area of the second microphone element 1321 may coincide with or be parallel to the main axis of the sound receiving area 13121 of the first microphone element 1312. The sound receiving area of the second microphone element 1321 may receive sound signals from the second sound conducting hole 114. The sound receiving area 13121 of the first microphone element 1312 may receive sound signals from the first sound conducting hole 1223. Since signals of the main sound source in the second sound conducting hole 114 are small, the signals of the main sound source signal received by the sound receiving area of the second microphone element 1321 may be small, which may improve the quality of audio signals.

In some embodiments, the first circuit board 131 may be arranged parallel to an opening surface of the opening 112 and close to the opening 112. In some alternative embodiments, the first circuit board 131 may be arranged to be inclined to the opening surface of the opening 112 and close to the opening 112. In some embodiments, the switch 1311, the light-emitting element 1313, etc., described above may be arranged on the first circuit board 131. The switch 1311, the light-emitting element 1313, and the first microphone element 1312, etc., may be arranged on the first circuit board 131 in a certain arrangement manner. Correspondingly, the switch hole 1213, the light outlet 1215, the microphone hole 1214, etc., may be arranged on the cover 12 at intervals to transmit signals to the outside of the electronic component through corresponding holes.

In some embodiments, the microphone hole 1214 may be arranged at a center of the cover 12. The switch hole 1213 and the light outlet 1215 may be arranged on both sides of the microphone hole 1214 in a length direction of the cover 12, respectively. A distance between the switch hole 1213 and the microphone hole 1214 and a distance between the light outlet 1215 and the microphone hole 1214 may be in a range of 5-10 millimeters. In some embodiments, the distance between the switch hole 1213 and the microphone hole 1214 and/or the distance between the light outlet 1215 and the microphone hole 1214 may be 5 millimeters, 6 millimeters, 7 millimeters, 8 millimeters, 9 millimeters, 10 millimeters, etc. The distance between the switch hole 1213 and the microphone hole 1214 and the distance between the light outlet 1215 and the microphone hole 1214 may be the same or different.

In some embodiments, the container body 11 may extend from the opening 112 in a direction perpendicular to the opening surface to form the cavity 111 having a certain width. In some embodiments, the second circuit board 132 may be arranged parallel to a width direction of the cavity 111 and perpendicular to the opening surface. In some alternative embodiments, the second circuit board 132 may be arranged to be inclined to the width direction of the cavity 111 and inclined to the opening surface of the opening 112. The second circuit board 132 may be arranged in the cavity 111 and inclined to the first circuit board 131. A main control chip, an antenna, etc., may be arranged on the second circuit board 132.

In some embodiments, the second circuit board 132 may be arranged to be inclined to the width direction of the cavity 111 and inclined to the opening surface of the opening 112. An angle between the second circuit board 132 and the width direction of the cavity 111 may be in a range of 5°-20°. In some embodiments, the angle between the second circuit board 132 and the width direction of the cavity 111 may be any angle within the above range, for example, 5°, 10°, 15°, 20°, etc.

In some embodiments, when a user uses the electronic device, the main axis of the sound receiving area of the second microphone element 1321 may coincide with the main axis of the sound receiving area 13121 of the first microphone element 1312. The first microphone element 1312 and the second microphone element 1321 may be located at a straight line where the mouth of the user is located.

In some embodiments, the first microphone element 1312 and the second microphone element 1321 may be respectively arranged on two circuit boards. The two microphone elements may receive sound signals through the first sound conducting hole 1223 and the second sound conducting hole 114, respectively. One of the two microphone elements may be configured to collect main sounds such as human voices, and the other of the two microphone elements may have a background noise collection function, which facilitates the collection of ambient noises. The two microphone elements may cooperate with each other to analyze and process the received sound signals, which may reduce noises, etc., thereby improving the processing quality of the sound signal.

In some embodiments, as shown in FIG. 8 and FIG. 9, FIG. 9 is a schematic diagram of an electronic component having a first circuit board and a second circuit board with an angle different from that of FIG. 8 according to some embodiments of the present disclosure. The first circuit board 131 and the second circuit board 132 may be arranged in the same cavity 111 and inclined to each other, which may make the installation of the two circuit boards more flexible. An angle between the two circuit boards may be adjusted according to sizes and positions of electronic elements on the two circuit boards, which may improve the space utilization rate of the electronic component. When the above arrangement is further applied to an electronic device, a space of the electronic device may be saved, so as to facilitate the thinning of the electronic device.

In some embodiments, the angle between the first circuit board 131 and the second circuit board 132 may be in a range of 50° to 150°. Specifically, the angle between the first circuit board 131 and the second circuit board 132 may be any angle within the above range, such as 70°, 80°, 90°, 100°, 110°, etc.

Specifically, in some embodiments, the opening 112 and the cover 12 may be arranged in a corresponding long strip shape. A shape of the first circuit board 131 may match or conform a shape of the opening 112. A width di of the first circuit board 131 may be not larger than a size of the opening surface along the width direction of the opening 112, such that the first circuit board 131 (parallel or inclined to a surface where the opening is located) can be accommodated at a position in the cavity 111 near the opening 112, that is, the first circuit board 131 may be arranged in the long strip shape. Correspondingly, the switch 1311, the light-emitting element 1313, and the first microphone element 1312 may be arranged on the first circuit board 131 at intervals along the length direction (i.e., the length direction of the cover 12) of the first circuit board 131.

In some embodiments, the second microphone element 1321 may be a bone conductive microphone. The bone conductive microphone may extend out of the container body 11 through the second sound conducting hole 114. The bone conductive microphone may be installed on a sidewall of the container body 11. The sidewall of the container body 11 refers to a sidewall that fits and contacts the user's body when the user wears the electronic component, such that the bone conductive microphone can better receive a vibration signal of the main sound source. When the user wears the electronic device and performs voice input, the second microphone element 1321 may mainly collect the vibration signal of the main sound source and compare the vibration signal with a sound signal (including an audio signal and noises) collected by the first microphone element 1312 (air conduction). In some embodiments, the sound signal collected by the first microphone element 1312 may be optimized based on the above comparison result to obtain a high-quality audio signal.

In some embodiments, the second sound conducting hole 114 that passes through the sidewall of the cavity 111 may be arranged on the component body 10. A second sound barrier 115 may be arranged at a position corresponding to the second sound conducting hole 114. The second sound barrier 115 may extend toward the inside of the cavity 111 through the second sound conducting hole 114 to limit the transmission direction of the sound to the second microphone element 1321.

In some embodiments, the second sound conducting hole 114 corresponding to the second microphone element 1321 may be arranged on the component body 10. The second microphone element 1321 may communicate with the outside via the second sound conducting hole 114 that penetrates the cavity 111, such that the second microphone element 1321 may receive sound signals from the outside.

The second sound barrier 115 may be a hard material or a soft material. For example, the second sound barrier 115 may be formed by the container body 11 extending from inside of the cavity 111 along the periphery of the second sound conducting hole 114 toward the inside of the cavity 11. In some embodiments, the second sound barrier 115 may be formed by a soft rubber that is integrally injected with the container body 11 and extends into the cavity 111 along the periphery of the second sound conducting hole 114 on the inner side of the cavity 111. In some embodiments, the second sound barrier 115 may extend into the cavity 111 along the circumference of the second sound conducting hole 114. Further, the second sound barrier 115 may extend to the second microphone element 1321 and surround the sound receiving area of the second microphone element 1321 to form a channel connecting the second sound conducting hole 114 and the second microphone element 1321, such that the sound signal input from the outside into the second sound conducting hole 114 directly passes through the channel and is received by the sound receiving area of the second microphone element 1321. In some embodiments, the second sound barrier 115 may not completely surround the circumference of the second sound conducting hole 114, but only extend along one or both sides of the second sound conducting hole 114 toward the inside of the cavity 111. In some embodiments, the second sound barrier 115 may extend to the second microphone element 1321 to conduct the sound input from the second sound conducting hole 114 to propagate to the second microphone element 1321 and be received by the sound receiving area of the second microphone element 1321.

In some embodiments, the first circuit board and the second circuit board may be made of a flexible circuit board or a soft-hard combined double-layer circuit board. For example, the flexible circuit board may be bent in the cavity to form the first circuit board and the second circuit board. As another example, the soft-hard combined double-layer circuit board may include a flexible connecting board and two hard circuit boards connected to both ends of the flexible connecting board. The two hard circuit boards may be arranged inclined to each other to form the first circuit board and the second circuit board.

The soft-hard combined double-layer circuit board may be a circuit board including areas of different hardness. In some embodiments, both sides of the soft-hard combined double-layer circuit board may be hard circuit boards with higher hardness. The middle of the soft-hard combined double-layer circuit board may be the flexible connecting board with lower hardness. The flexible connecting board may divide the hard circuit boards into two areas. The two areas may form the first circuit board 131 and the second circuit board 132, respectively.

In some embodiments, the first circuit board 131 and the second circuit board 132 may be the same circuit board. The circuit board may be a flexible circuit board and bent in the cavity to adapt to the cavity space better. After the circuit board is bent, two parts at the two ends of the bend of the circuit board may form the first circuit board 131 and the second circuit board 132, respectively. After bending, the first circuit board 131 and the second circuit board 132 may be inclined to each other. The flexible circuit board may make the installation of the circuit board easier due to its own deformability.

In some embodiments, the first circuit board 131 and the second circuit board 132 may be the same circuit board. The circuit board may be a soft-hard combined double-layer circuit board and bent in the cavity to adapt to the cavity space better. A bending area of the circuit board may be made of a soft material and two sides of the bending area may be made of a hard material. The two sides of the bending area may form the first circuit board 131 and the second circuit board 132, respectively. After bending, the first circuit board 131 and the second circuit board 132 may be inclined to each other. Since the soft-hard combined circuit board has deformability, the circuit board may better adapt to the limited space in the cavity.

Figure 11:
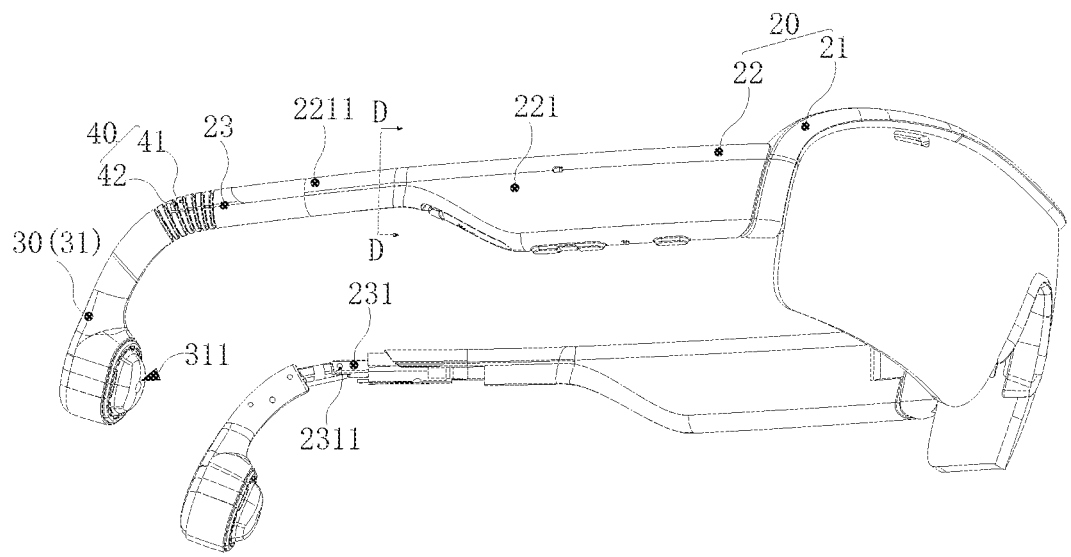
FIG. 11 is a structural diagram illustrating an exemplary state of glasses according to some embodiments of the present disclosure.
Figure 12:
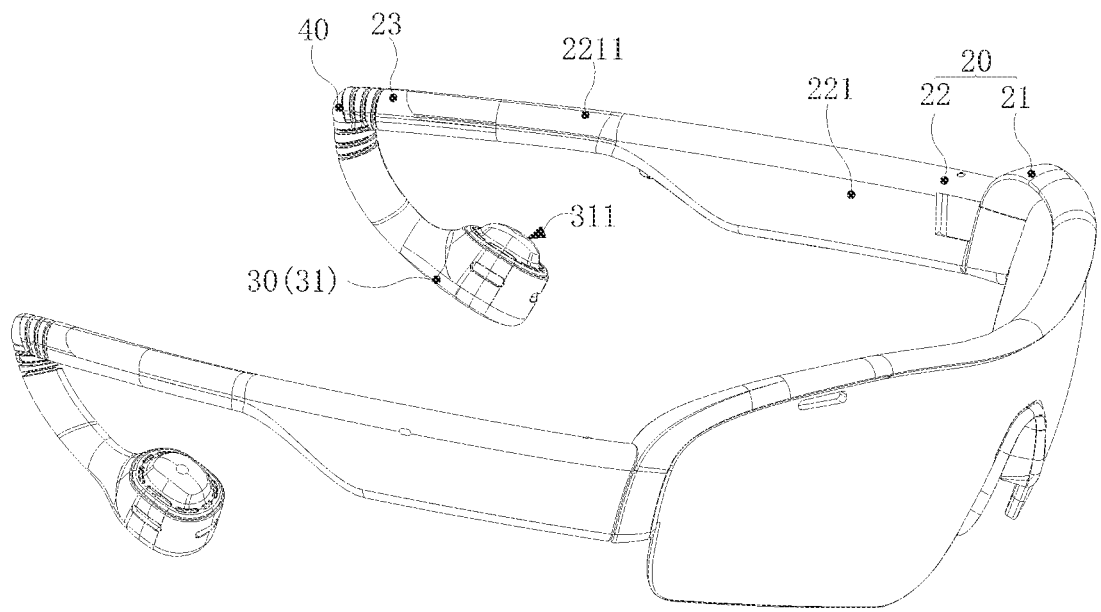
FIG. 12 is a structural diagram illustrating another exemplary state of glasses according to some embodiments of the present disclosure.

Referring to FIG. 11 and FIG. 12, FIG. 11 is a structural diagram illustrating an exemplary state of glasses according to some embodiments of the present disclosure, FIG. 12 is a structural diagram illustrating another exemplary state of glasses according to some embodiments of the present disclosure. Compared with conventional near-sighted glasses, hyperopic glasses, sunglasses, etc., the glasses in FIGS. 11-12 may include circuit structures, electronic components, etc., to make the glasses be an electronic device with other functions.

In some embodiments, the glasses may include a glasses bracket 20. The glasses bracket 20 may include glasses frame 21 and two temples 22. A temple 22 may include a temple body 221 connected to the glasses frame 21. At least one temple body 221 may include the electronic component as described elsewhere in the present disclosure.

A component body in the electronic component may be the temple body 221 or a part of the temple body 221. In some embodiments, a cavity 111 may be arranged in the temple body 221 for accommodating a circuit component 13 corresponding to the electronic component as described elsewhere in the present disclosure, such that the glasses have functions corresponding to the circuit component 13.

It should be further pointed out that when the electronic components as described elsewhere in the present disclosure are used in the glasses, the first circuit board 131 and the second circuit board 132 may be both arranged in the cavity 111 of the same temple 22. For example, the first circuit board 131 and the second circuit board 132 may be both arranged in the cavity 111 of a right temple or a left temple. The cover 12, the light-emitting hole 1215, a button, the first sound conducting hole 1223, etc., corresponding to the cover 12 may be all arranged on a side of the temple body 221 facing an underside of the user's head. The temple body 221 facing an upper side of the user's head may be surrounded by a housing of the temple body 221 completely. In some embodiments, the second sound conducting hole 114 may be arranged on an upper side of the temple body 221 facing outside of the user's head.

Other related structures and functions of the electronic component may be the same as the descriptions of the electronic component as described elsewhere in the present disclosure. More related details may refer to the above embodiments of the electronic component in the present disclosure, which is not repeated herein.

In some embodiments, the temple 22 may include a connector 23 that is hinged, by a hinge 231, with an end of the temple body 221 away from the glasses frame 21. In some embodiments, the glasses may include a functional component 30 which is arranged on the connector 23 to realize corresponding functions by the circuit component 13, etc., in the component body.

In some embodiments, the functional component may be an air conductive loudspeaker or a bone conductive loudspeaker. For the convenience of description, the functional components may be described by taking a bone conductive loudspeaker 31 as an example. In some embodiments, the connector 23 may be arranged so that the bone conductive loudspeaker 31 may switch between a first position and a second position relative to the temple body 221. When being in the first position, the bone conductive loudspeaker 31 may be attached to a back of the user's auricle through an attachment surface 311.

Specifically, the first position of the bone conductive loudspeaker 31 relative to the temple body 221 is shown in FIG. 11 and the second position relative to the temple body 221 is shown in FIG. 12.

An auricle may be a part of an outer ear and mainly composed of cartilage. In some embodiments, when a loudspeaker is attached to a back of the auricle, sounds/vibrations may be transmitted by the cartilage of the auricle, which reduces the impact on an ear canal during sound transmission while improving the sound quality.

Figure 13:
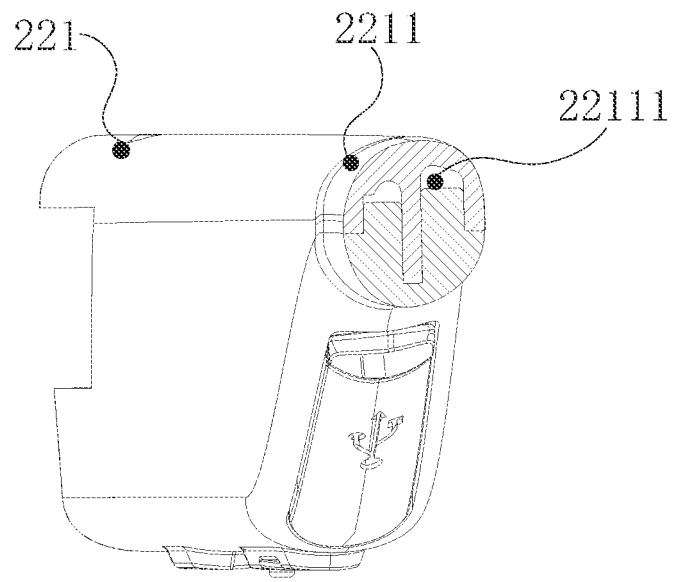
FIG. 13 is a schematic diagram illustrating an exemplary cross-sectional view of glasses along D-D axis in FIG. 11 according to some embodiments of the present disclosure.
Figure 14:
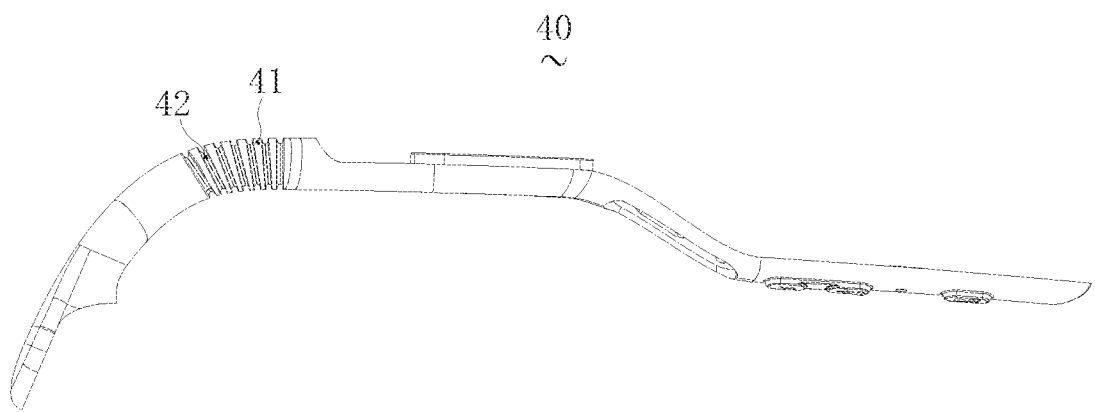
FIG. 14 is a schematic diagram illustrating an original state of a protective sleeve of glasses according to some embodiments of the present disclosure.

Referring to FIG. 13, FIG. 13 is a schematic diagram illustrating an exemplary cross-sectional view of glasses along D-D axis in FIG. 11 according to some embodiments of the present disclosure. In some embodiments, the component body of the temple body 221 may be arranged on a side of the temple body 221 close to the glasses frame 21. The temple body 221 may include a rod-shaped component 2211 that extends from the component body to the connector 23. A weight-reducing groove 22111 may be arranged on the rod-shaped component 2211. The soft cover 122 may extend outward from the hard bracket 121 to cover and seal the weight-reducing groove 22111.

In some embodiments, the temple body 221 may be divided into two parts. One of the two parts may be arranged close to the glasses frame and other of the two parts may be arranged close to the connector 23. The component body may be arranged on a side close to the glasses frame to accommodate the corresponding circuit component 13. The rod-shaped component 2211 close to the connector 23 may be configured to at least partially support the user's ear when the user wears the glasses.

The weight-reducing groove 22111 may be arranged inside the temple body 221 along an extending direction of the rod-shaped component 2211. The rod-shaped component 2211 may be a partially hollow structure, which reduces an entire weight of the glasses in a certain extent and improves an overall elasticity of the rod-shaped component, thereby improving wearing comfort of the user.

Figure 15:
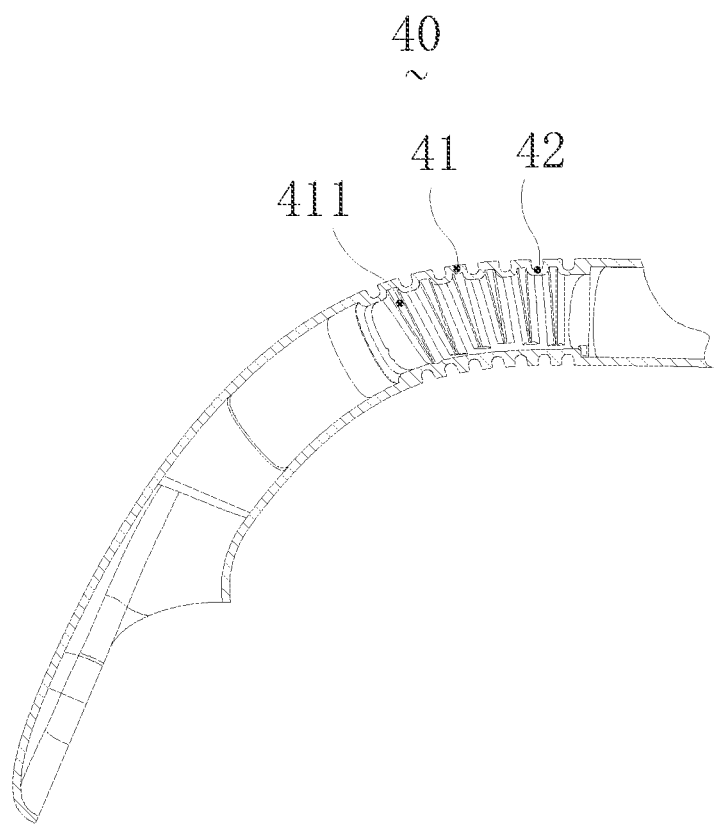
FIG. 15 is a schematic diagram illustrating an exemplary partial cross-sectional view of an original state of a protective sleeve of glasses according to some embodiments of the present disclosure.
Figure 16:
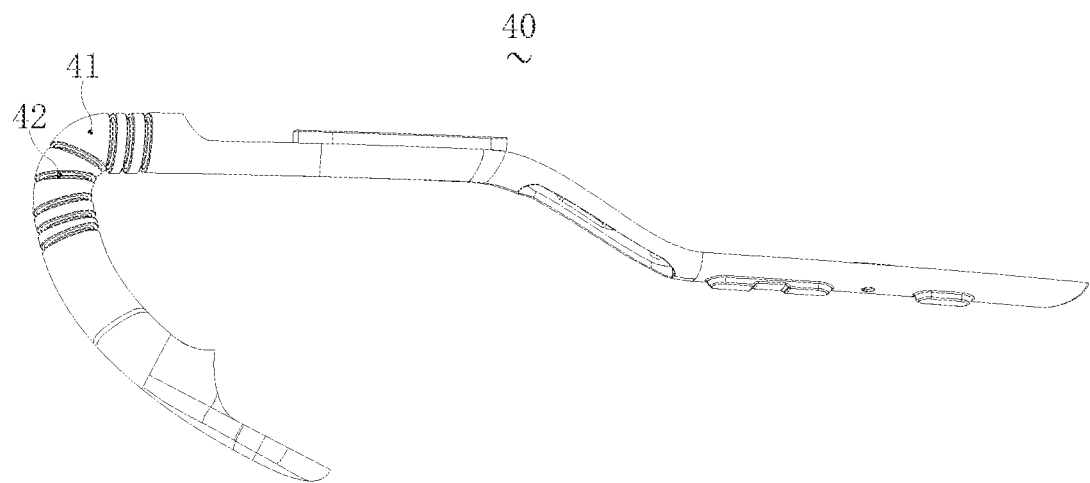
FIG. 16 is a schematic diagram illustrating a bending state of a protective sleeve of glasses according to some embodiments of the present disclosure.
Figure 17:
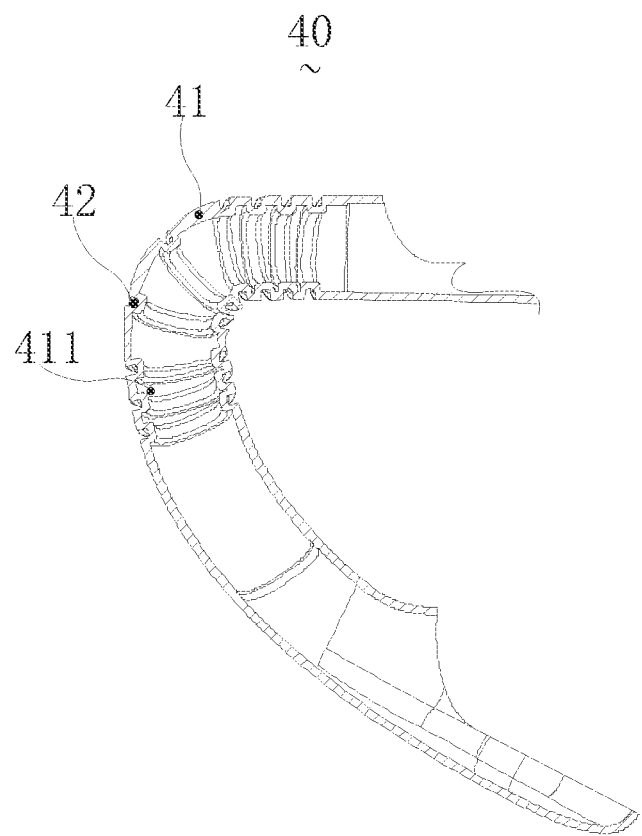
FIG. 17 is a schematic diagram illustrating an exemplary partial cross-sectional view of a bending state of a protective sleeve of glasses according to some embodiments of the present disclosure.

Referring to FIGS. 14-17, FIG. 14 is a schematic diagram illustrating an original state of a protective sleeve of glasses according to some embodiments of the present disclosure; FIG. 15 is a schematic diagram illustrating an exemplary partial cross-sectional view of an original state of a protective sleeve of glasses according to some embodiments of the present disclosure; FIG. 16 is a schematic diagram illustrating a bending state of a protective sleeve of glasses according to some embodiments of the present disclosure; FIG. 17 is a schematic diagram illustrating an exemplary partial cross-sectional view of a bending state of a protective sleeve of glasses according to some embodiments of the present disclosure. The glasses may include a protective sleeve 40 sheathed on the periphery of the hinge 231. The protective sleeve 40 may be bent along with the hinge 231 to protect the hinge 231 and prevent the hinge 231 from pinching user's hairs while the user wears the glasses, which may bring a bad experience to the user.

In some embodiments, the protective sleeve may be bent along with the hinge 231 when the bone conductive loudspeaker 31 is switched between the first position and the second position.

In some embodiments, the protective sleeve 40 may include a plurality of annular ridges 41 arranged at intervals along a length direction of the protective sleeve 40 and an annular connecting portion 42 arranged between two adjacent annular ridges 41 and configured to connect the two adjacent annular ridges. A thickness of a tube wall of an annular ridge 41 may be larger than a thickness of a tube wall of the annular connecting portion 42.

The length direction of the protection sleeve 40 may be consistent with a length direction of the hinge 231. The protection sleeve 40 may be arranged along the length direction of the hinge 231. The protective sleeve 40 may be made of a soft material, such as a soft silica gel, a rubber, etc.

An annular ridge 41 may be formed by the outer sidewall of the protective sleeve 40 protruding outward. A shape of an inner sidewall of the protective sleeve 40 corresponding to the plurality of annular ridges 41 may be not limited herein. For example, the inner sidewall may be smooth, or include a sunken that is arranged on the inner sidewall corresponding to each annular ridge 41.

The annular connecting portion 42 may be configured to connect the two adjacent annular ridges 41. Specifically, the annular connecting portion 42 may be connected to an edge area of the two adjacent annular ridges 41 close to the inside of the protective sleeve 40, such that the outer sidewall of the protective sleeve 40 may be recessed relative to the annular ridges 41.

In some embodiments, a count of the plurality of annular ridges 41 and a count of the annular connecting portions 42 may be determined according to actual usage conditions. For example, the count of the plurality of annular ridges 41 and the count of the annular connecting portions 42 may be determined based on a length of the protective sleeve 40, a width of each annular convex ridge 41 and a width of each annular connecting portion 42 along a length direction of the protective sleeve 40.

In some embodiments, the thickness of the tube wall of the annular ridge 41 may refer to a thickness between the inner and outer sidewalls of the protective sleeve 40 corresponding to the annular ridge 41. The thickness of the tube wall of the annular connecting portion 42 may refer to a thickness between the inner and outer sidewalls of the protective sleeve 40 corresponding to the annular connecting portion 42. In some embodiments, the thickness of the tube wall of the annular ridge 41 may be larger than the thickness of the tube wall of the annular connecting portion 42.

As shown in FIG. 16 and FIG. 17, when the protective sleeve 40 is bent along with the hinge 231, the annular ridge(s) 41 and the annular connecting portion(s) 42 may be in a stretched state in an outer region of the protective sleeve 40 in the bent shape and the annular ridge(s) 41 and the annular connecting portion(s) 42 may be in a compressed state in an inner region of the protective sleeve 40 in the bent state.

In the above embodiments, the thickness of the tube wall of the annular ridge(s) 41 may be greater than the thickness of the tube wall of the annular connecting portion(s) 42, such that the annular ridge(s) 41 may be harder than the annular connecting portion(s) 42. Therefore, when the protective sleeve 40 is in a bent state and the outer region of the protective sleeve 40 is in a stretched state, the annular ridge(s) 41 may provide a certain strength support for the protective sleeve 40. When the inner region of the protective sleeve 40 is in the compressed state, the annular ridge(s) 41 may withstand a certain compressing force, thereby protecting the protective sleeve 40, improving the stability of the protective sleeve 40, and extending the life of the protective sleeve 40.

It should be pointed out that a bending shape of the protective sleeve 40 may be consistent with a state of the hinge 231. In some embodiments, the functional component 30 and the temple body 221 may be rotated within a range of less than or equal to 180° through the hinge 231, that is, the protective sleeve 40 can only be bent toward one side. Therefore, when the glasses are used, one of two sides along a length direction of the protective sleeve 40 may be compressed and other side of the two sides may be stretched.

In some embodiments, when the protective sleeve 40 is in the bent state, a width of the annular ridge 41 toward the outer side of the bending shape formed by the protective sleeve 40 along the length direction of the protective sleeve 40 may be greater than a width along the length direction of the protective sleeve 40 toward the inner side of the bending shape.

In some embodiments, the increase of the width of the annular ridge 41 along the length direction of the protective sleeve 40 may improve the strength of the protective sleeve. In some embodiments, an initial angle between the functional component 30 and the temple body 221 may be less than 180°. In such cases, if the annular ridges 41 of the protective sleeve 40 are uniformly arranged, the protective sleeve 40 may be compressed in the original state. In the above embodiments, when the protective sleeve 40 is in the bent state, a width of the annular ridge 41 facing the outer side of the bending shape may be larger, which may enlarge the length of the protective sleeve 40 and improve the strength of the protective sleeve 40, and further reduce, in a certain extent, a degree of the stretching of the protective sleeve 40 on a stretched side of the protective sleeve 40. In addition, when the protective sleeve 40 is in the bent state, a width of the annular ridge 41 facing the inner side of the bending shape along the length direction of the protective sleeve 40 may be smaller, which may increase a space of the annular connecting portion 42 in the compressed state along the length direction of the protective sleeve 40, thereby alleviating the compression on the compression side to a certain extent.

In some embodiments, the width of the annular ridge 41 may gradually decrease from a side toward the outer region of the bending shape to a side toward the inner region of the bending shape, such that when the protective sleeve 40 is in a bending shape, the width of the outer region of the bending shape formed by the protective sleeve 40 may be greater than the width of the inner region of the bending shape.

It should be understood that the annular ridges 41 may be arranged around the periphery of the protective sleeve 40. In the length direction of the protective sleeve 40, one side of the annular ridges 41 may correspond to a stretched side and the other side of the annular convex ridges 41 may correspond to a compressed side. In some embodiments, the width of the annular ridges 41 may gradually decrease from the side toward the outer region of the bending shape to the side toward the inner region of the bending shape, such that the width of the annular ridges 41 changes more uniformly, thereby improving the stability of the protective sleeve 40 to a certain extent.

In some embodiments, when the protective sleeve 40 is in a bending state, the annular ridges 41 may be provided with grooves 411 on an inner annular surface of the protective sleeve 40 on the outer region of the bending shape formed by the protective sleeve 40.

The grooves 411 may be arranged along a direction perpendicular to the length direction of the protective sleeve 40, such that the annular ridges 41 corresponding the grooves 411 may be properly stretched when the protective sleeve 40 is stretched in the length direction.

As described above, when the protective sleeve 40 is in the bent state, the protective sleeve 40 facing the outer region of the bending shape formed by the protective sleeve 40 may be in the stretched state. Further, the grooves 411 may be arranged on the inner annular surface of the protective sleeve 40 corresponding to the annular ridges 41, such that when a side of the protective sleeve is stretched corresponding to the grooves 411, the annular ridges 41 corresponding to the grooves 411 may be properly stretched to undertake partial stretching, thereby reducing a tensile force received by the side of the protective sleeve and protecting the protective sleeve 40.

It should be pointed out that when the protective sleeve 40 is in the bent state, the annular ridges 41 facing the inner region of the bending shape may not be provided with the grooves 41 on the inner sidewall of the protective sleeve 40 corresponding to the annular ridges 41. In some embodiments, a width of each groove 41 along the length direction of the protective sleeve 40 may gradually decrease from the side toward the outer region of the bending shape to the inner region of the bending shape, such that the grooves 411 may be not arranged on the inner sidewall of the protective sleeve 40 corresponding to the annular ridges 41 facing the inner region of the bending shape.

In some embodiments, the protective sleeve 40 may be connected with the temple body 221 and the bone conductive loudspeaker 31 arranged on both sides in the length direction of the protective sleeve 40, respectively. In some embodiments, the protective sleeve 40 and the soft cover 122 of the cover 12 may be integrally formed, thereby making the glasses more closed and integrated.

In some embodiments, the functional component may be the bone conductive loudspeaker 31. The hinge 231 may include a shaft 2311. A vertical plane α of the shaft 2311 of the hinge 231, a symmetry plane β of the connector 23, and a center point O of an attachment surface 311 of the bone conductive loudspeaker 31 attaching the ear may be in the same plane or the same relative plane that is in a predetermined error range.

Figure 18:
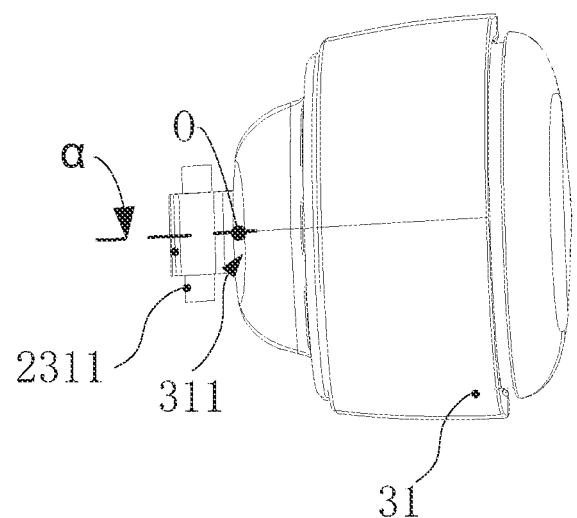
FIGS. 18-21 are schematic diagrams illustrating related sidewalls of glasses according to some embodiments of the present disclosure.

The vertical plane α of the shaft 2311 of the hinge 231 refers to a plane perpendicular to an axial direction of the shaft 2311 of the hinge 231 and symmetrically dividing the shaft 2311 of the hinge 231. More details regarding the vertical plane α may refer to FIG. 18.

Figure 19:
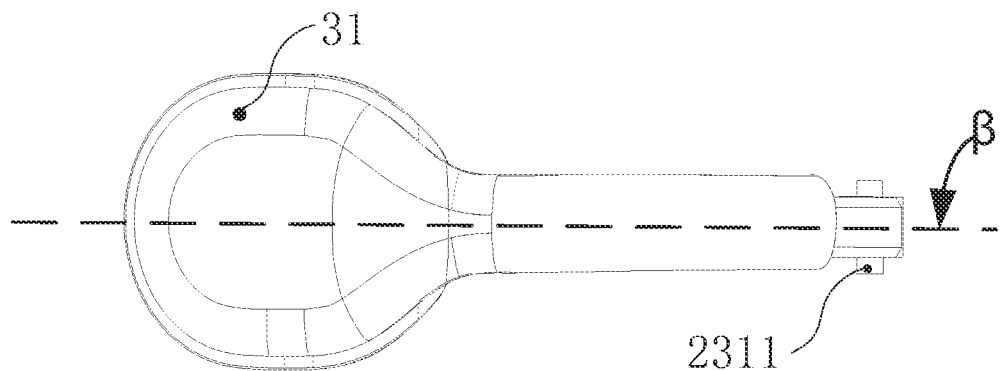

The symmetry plane β of the connector 23 refers to a plane that divides the connector 23 symmetrically, that is, the connector 23 may be distributed symmetrically on both sides of the symmetry plane β of the connector 23. More details regarding the symmetry plane β may refer to FIG. 19.

The predetermined error range may be obtained based on experience, the materials and specifications of the connector, and the statistical data of shapes of ears.

The vertical plane α of the shaft 2311 of the hinge 231, the symmetry plane β of the connector 23, and the center point of the attachment surface 311 of the bone conductive loudspeaker 31 may be in the same plane, which enables the bone conductive loudspeaker 31 connected with the connector 23 to directly attach the back of the user's auricle. When the connector 23 deforms under a force, a deformation direction of the connector 23 and a movement direction of the bone conductive loudspeaker 31 may be the same and in the plane. Otherwise, when the connector 23 deforms under a force, the deformation direction of the connector 23 and the movement direction of the bone conductive loudspeaker 31 may be not in the same plane, such that the bone conductive loudspeaker 31 may not attach or completely attach the back of a user's auricle due to the twisting of the connector 23 and the bone conductive loudspeaker 31, thereby resulting in a reduction in the efficiency of sound/vibration transmission and reducing the sound quality of the generating device of the bone conductive loudspeaker. Certainly, the vertical plane α of the shaft 2311 of the hinge 231, the symmetry plane β of the connector 23, and the center point of the attachment surface 311 of the bone conductive loudspeaker 31 may be in the same relative plane within the predetermined error range, which may not cause too much influence on the user during the usage process, but may affect the attaching effect of the attachment surface 311 of the bone conductive loudspeaker 31 and the back of the user's auricle to a certain extent.

In some embodiments, when the bone conductive loudspeaker 31 is at the first position with respect to the temple body 221, an angle between a horizontal reference plane γ defined by the tops of the two temple bodies 221 and the symmetry plane β of the connector 23 may be 65°-85°.

Figure 20:
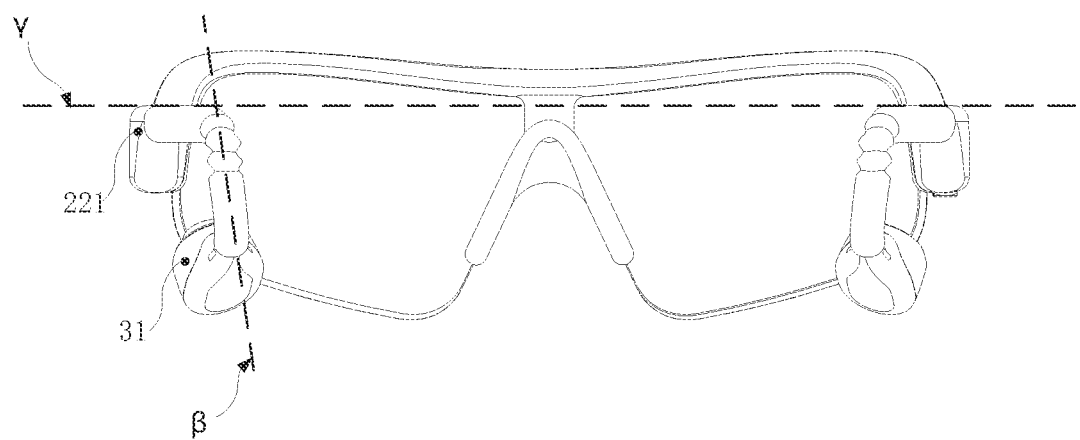

The horizontal reference plane γ defined by the tops of the two temple bodies 221 refers to a plane tangent to the tops of the two temple bodies 221. In some embodiments, as shown in FIG. 20, the horizontal reference plane γ may further be perpendicular to a symmetry plane of the glasses frame 21. The symmetry plane β of the connector 23 may be the same as that shown in FIG. 19, which may not be repeated herein.

When the bone conductive loudspeaker 31 is at the first r position relative to the temple body 221, if the angle between the horizontal reference plane γ defined by the tops of the two temple bodies 221 and the symmetry plane β of the connector 23 is larger, the bone conductive loudspeaker 31 may be closer to the outer side of the back of the auricle. If the angle is too large, the bone conductive loudspeaker 31 may not even attach to the auricle. If the angle is small, the bone conductive loudspeaker 31 may be too close to the inside of the back of the auricle, and even compress the skull of the head, which may reduce the comfort of the user and affect the sound/vibration transmission of the bone conductive loudspeaker through the ear cartilage, thereby reducing the sound quality of the bone conductive loudspeaker. When the angle is in a range of 65° to 85°, the bone conductive loudspeaker may be attached to a relatively moderate position on the back of the user's auricle.

In addition, when the bone conductive loudspeaker 31 is at the first position with respect to the temple body 221, the angle between the horizontal reference plane γ defined by the tops of the two temple bodies 221 and the symmetry plane β of the connector 23 may also be 70°-82°, such that the attachment surface 311 of the bone conductive loudspeaker 31 may be closer to the back area of the auricle directly opposite to a position of the ear cartilage.

Specifically, when the bone conductive loudspeaker 31 is at the first position with respect to the temple body 221, the angle between the horizontal reference plane γ defined by the tops of the two temple bodies 221 and the symmetry plane β of the connector 23 may be any angle within the above range, such as 70°, 75°, 80°, 82°, etc., which is not limited herein.

When the bone conductive loudspeaker 31 is at the first position with respect to the temple body 221, an angle between a symmetry plane λ of the glasses frame 21 and the symmetry plane β of the connector 23 may be 5°-30°.

Figure 21:
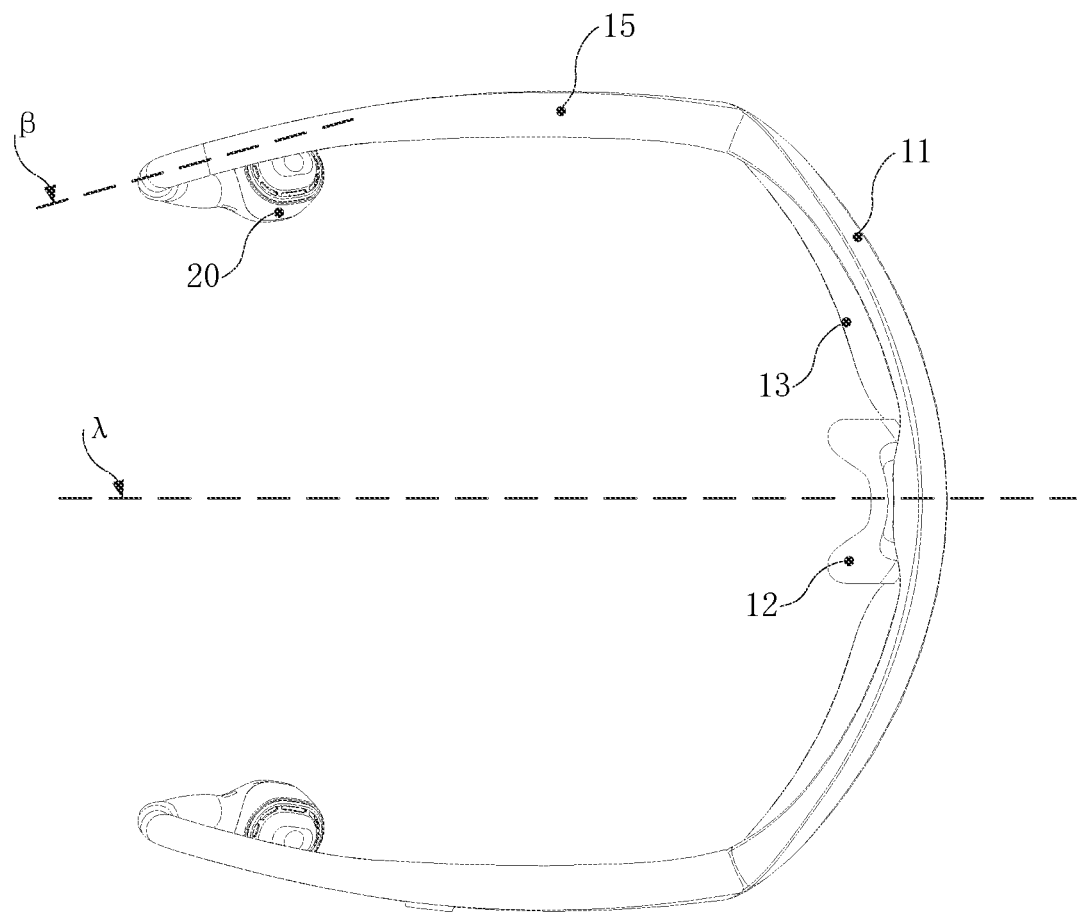

As shown in FIG. 21, the symmetry plane λ of the glasses frame 21 refers to a symmetry plane that divides the glasses frame 21 symmetrically. The symmetry plane β of the connector 23 may be the same as that shown in FIG. 19, which is not repeated herein.

The angle between the symmetry plane λ of the glasses frame 21 and the symmetry plane β of the connector 23 may be related to the user's head shape. For example, the angle between the symmetry plane λ of the glasses frame 21 and the symmetry plane β of the connector 23 corresponding to the European and American population and the Asian population may be different. When the user wears the glasses, in order to fix the bone conductive loudspeaker 31 in a suitable position, the user's ears may support a bottom surface of the temple body 221 and the side surface of the temple body 221 needs to abut against the side of the user's head. Therefore, if the angle is large, a front part of the temple body 221 abuts against the head and a rear part of the temple body 221 may be away from the head. If the angle is large, the front part of the temple body 221 may be away from the head and the rear part of the temple body 221 abuts against the head. In both cases, the temple body 221 may not make good contact with the head, which may easily cause the attachment surface 311 of the bone conductive loudspeaker 31 to separate from the back of the auricle, thereby reducing the sound quality of the bone conductive loudspeaker 31 and making it inconvenient to the usage of the user.

When the bone conductive loudspeaker 31 is at the first position with respect to the temple body 221, the angle between the symmetry plane λ of the glasses frame 21 and the symmetry plane β of the connector 23 may be 10°-25°. In some embodiments, the angle may also be 10°, 15°, 20°, 25°, etc.

Figure 22:
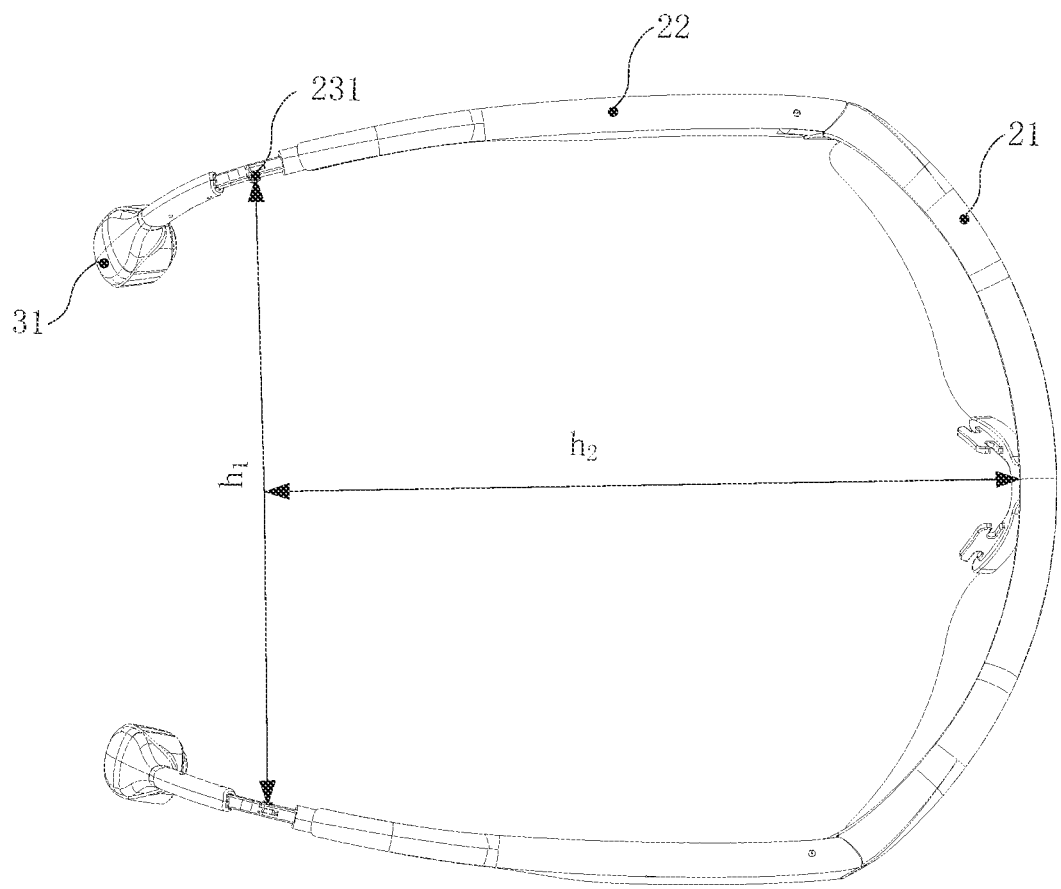
FIGS. 22-23 are schematic diagrams illustrating distances between related units of glasses according to some embodiments of the present disclosure.

As shown in FIG. 22, a distance $h_1$ between the center points of the shaft 2311 of the hinge 231 corresponding to the two temples 22 may be 90-150 millimeters. This distance h1 may correspond to a left and right width of the user's head.

When the two temples 22 are placed on an upper part of the user's ears and clamped on both sides of the head, if the distance $h_1$ between the center points of the shaft 231 of the hinge 231 corresponding to the two temples 22 is large, a clamping force of the temples 22 towards the user's head may be relatively small and a situation of "not tightly clamped" may occur. As a result, the glasses may easily loosen from the user's head and the bone conductive loudspeaker 31 may deviate from the position corresponding to the back of the auricle. However, if the distance $h_1$ is small, the temples 22 may clamp the user's head too much, which may cause discomfort to the user.

The distance $h_1$ between the center points of the shaft 2311 of the hinge 231 corresponding to the two temples 22 may be 100-130 mm. In some embodiments, the distance $h_1$ may also be 100 mm, 110 mm, 120 mm, 130 mm, etc. In some embodiments, different users have different head shapes, which may choose a headset with a more appropriate range of distance $h_1$. For example, the distance $h_1$ for male glasses may be in a range of 115-130 millimeters and the distance $h_1$ for female glasses may be in a range of 100-115 millimeters. Certainly, the distance $h_1$ may be set to a middle value of the two ranges to suit both male and female at the same time.

As shown in FIG. 22, a vertical distance $h_2$ of a line connecting the symmetrical center point of the glasses frame 21 and the center point of the shafts 2311 of the two hinges 231 may be 105-170 millimeters.

The symmetrical center point of the glasses frame 21 may be a midpoint of the nose bridge in the middle of the glasses frame 21. The vertical distance $h_2$ may correspond to a front and back length of the user's head.

If the vertical distance $h_2$ is large, when the attachment surface 311 of the bone conductive loudspeaker 31 is attached to the back of the auricle, the glasses frame 21 may be far away from the user's eyes. When the earphone glasses frame 21 are worn, the attachment surface 311 of the bone conductive loudspeaker 31 may not attach properly on the back of the auricle due to it is far away from the back of the auricle. If the vertical distance $h_2$ is small, when the glasses and earphone are used at the same time, the glasses frame 21 and the bone conductive loudspeaker 31 clamp the head too tightly at the same time, which causes discomfort to the user. When the vertical distance $h_2$ is too small, it is even difficult to use the glasses and earphone at the same time.

The vertical distance $h_2$ of the line connecting the symmetrical center point of the glasses frame 21 with the center point of the shafts 2311 of the two hinges 231 may also be 130-150 millimeters. Specifically, the vertical distance $h_2$ may be 130 millimeters, 140 millimeters, 150 millimeters, etc. In some embodiments, different user groups may correspond to different distance ranges. For example, the vertical distance $h_2$ for the male glasses may be in a range of 140~160 millimeters, and the vertical distance $h_2$ for the female glasses may be in a range of 105~135 millimeters. Certainly, the vertical distance $h_2$ may be set as a median value of the two ranges to suit both male and female at the same time.

Figure 23:
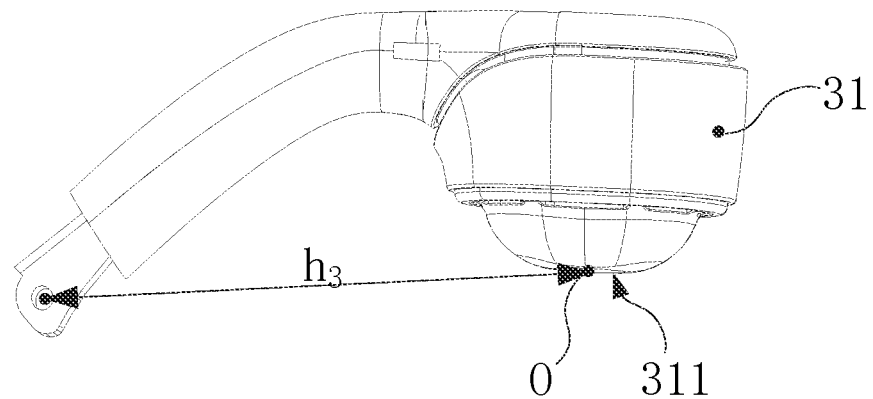

As shown in FIG. 22 and FIG. 23, a ratio (i.e., $h_3/h_2$) of a distance $h_3$ between the center point of the shaft 2311 of each hinge 231 and the center point O of the attachment surface 311 of the corresponding bone conductive loudspeaker 31 and the vertical distance $h_2$ of the line connecting the symmetric center point of the glasses frame 21 with the center point of the shafts 2311 of the two hinges 231 the glasses frame may be 0.1-1.5.

The distance $h_3$ between the center point of the shaft 2311 of each hinge 231 and the center point O of the attachment surface 311 of the corresponding bone conductive loudspeaker 31 may correspond to a distance between the center point of the shaft 2311 of the hinge 231 and an attachment position of the attachment surface 311 and the back of the user's auricle. The vertical distance $h_2$ between the symmetrical center point of the glasses frame 21 and the center point of the shafts 2311 of the two hinges 231 may correspond to a vertical distance from the front of the user's head to the back of the ear. When the vertical distance from the front of the user's head to the back of the ear is constant, if the distance between the center point of the shaft 2311 of the hinge 231 and the attachment position of the attachment surface 311 and the back of the user's auricle is relatively large, that is, the above ratio is relatively large, which indicates that the distance between the center point of the shaft 2311 of the hinge 231 and the center point O of the attachment surface 311 of the corresponding bone conductive loudspeaker 31 is relatively large, the bone conductive loudspeaker 31 may be easier to attach to the lower part of the back of the auricle. When the above ratio is small, which indicates that the distance between the center point of the shaft 2311 of the hinge 231 and the center point O of the attachment surface 311 of the corresponding bone conductive loudspeaker 31 is relatively small, the bone conductive loudspeaker 31 may be easier to attach to the upper part of the back of the auricle. Therefore, the sound/vibration transmission efficiency of the bone conductive loudspeaker 31 may be affected, and the sound quality may be further affected.

In some embodiments, $h_3/h_2$ may be in a range of 0.125-0.35, such as 0.125, 0.15, 0.20, 0.25, 0.30, 0.35, etc. Different ratios may be designed according to the different needs of users, which is not limited herein.

Further, the bone conductive sound loudspeaker of different specifications may be set according to the above parameters, such that the user may choose according to his/her head shape to satisfy the requirements of the user.

The above are only embodiments of the present disclosure and do not limit the scope of the present disclosure. Any equivalent structure or process transformation made by using the specification and drawings of the present disclosure, directly or indirectly applied to other related technologies in the same way, are included in the protection scope of the present disclosure.

The possible beneficial effects of the embodiments of the present disclosure may include but are not limited to: (1), the electronic component of the present disclosure may include a component body, a first circuit board, and a second circuit board, the first circuit board and the second circuit board being arranged inclined to each other in the cavity of the container body, the two circuit boards being respectively provided with a first microphone element and a second microphone element, correspondingly, a first sound conducting hole and a second sound conducting hole being respectively arranged on the sidewalls of the cover and the container body, such that the first microphone element and the second microphone element may receive sounds input from the first sound conducting hole and the second sound conducting hole, respectively, and the arrangement of two microphone elements may reduce noises; (2) the two circuit boards may be arranged in the cavity inclined to each other according to a spatial structure of the cavity, which makes full use of the space of the electronic components and improves the space utilization rate when the electronic component is applied to an electronic device, which beneficial to the thinness and lightness of the electronic device. It should be noted that different embodiments may have different beneficial effects. In different embodiments, the possible beneficial effects may include any one or more combinations of the above described beneficial effects, or any other potential beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An electronic component, comprising:
   a component body including a container body and a cover, the container body being hollow to form a cavity, an opening in flow communication with the cavity is arranged in the container body, the cover being arranged on the opening and closes the cavity;
   a first microphone element arranged in the cavity;
   a second microphone element arranged in the cavity;
   a first sound conducting hole arranged on a first sidewall of the component body and configured to conduct a first sound originating from a sound source to the first microphone element; and
   a second sound conducting hole arranged on a second sidewall of the component body and configured to conduct a second sound originating from the sound source to the second microphone element.

2. The electronic component of claim 1, wherein the second microphone element is arranged at a position farther from the sound source than the first microphone element.

3. The electronic component of claim 1, wherein the first sound conducting hole is arranged on the cover and vertical or inclined to a surface of the cover.

4. The electronic component of claim 1, wherein the second sound conducting hole is arranged on a sidewall, opposite to the cover or the first sound conducting hole, of the container body.

5. The electronic component of claim 1, wherein the electronic component further includes:
   a first circuit board; and
   a second circuit board, the first circuit board and the second circuit board being inclined to each other and arranged in the cavity.

6. The electronic component of claim 5, wherein
   the first microphone element is arranged on a sidewall, facing the component body, of the first circuit board, and
   the second microphone element is arranged on a sidewall, facing the component body, of the second circuit board.

7. The electronic component of claim 6, wherein the first circuit board is arranged facing the cover and parallel or inclined to the cover, the first microphone element being arranged on a side, facing the cover, of the first circuit board.

8. The electronic component of claim 6, wherein the second circuit board is arranged facing the container body, the second microphone element being arranged on a side, facing the container body, of the second circuit board.

9. The electronic component of claim 5, wherein
   an area of the first circuit board is smaller than an area of the second circuit board, and
   the opening and the cover are arranged in a corresponding strip shape, a size of the first circuit board along a width direction of the cover being smaller than a size of the second circuit board along a vertical direction of the first circuit board.

10. The electronic component of claim 5, wherein the first circuit board and the second circuit board are made of a flexible circuit board or a soft-hard combined double-layer circuit board, wherein:
    the flexible circuit board is bent in the cavity to form the first circuit board and the second circuit board; or
    the soft-hard combined double-layer circuit board includes a flexible connection board and two hard circuit boards respectively connected to both ends of the flexible connection board, the two hard circuit boards being inclined to each other to form the first circuit board and the second circuit board.

11. The electronic component of claim 5, wherein
    a switch and a light-emitting element are arranged on the first circuit board at intervals, or
    a main control chip and an antenna are arranged on the second circuit board.

12. The electronic component of claim 1, wherein the cover includes a hard bracket and a soft cover integrally molded on a surface of the hard bracket, wherein:
    the hard bracket is configured to mechanically connect the container body,
    a microphone hole is arranged on the hard bracket,
    the soft cover covers the microphone hole,
    a first sound barrier is arranged at a position, corresponding to the microphone hole, of the soft cover,
    the first sound barrier extends toward inside of the cavity through the microphone hole and defines a sound conducting channel,
    one end of the sound conducting channel is communicated with the first sound conducting hole, and
    the first microphone element is inserted into the sound conducting channel from the other end of the sound conducting channel.

13. The electronic component of claim 12, wherein:
    a second sound barrier is arranged at a position, corresponding to the second sound conducting hole, of the container body, and
    the second sound barrier extends toward the inside of the cavity through the second sound conducting hole to limit a transmission direction of a sound to the second microphone element.

14. The electronic component of claim 1, wherein the second microphone element includes a bone conductive microphone, the bone conductive microphone extending out of the component body through the second sound conducting hole.

15. The electronic component of claim 1, wherein a central axis of the first sound conducting hole coincides with a main axis of a sound receiving area of the first microphone element.

16. The electronic component of claim 1, wherein a central axis of the second sound conducting hole coincides with a main axis of a sound receiving area of the second microphone element.

17. The electronic component of claim 1, wherein a central axis of the second sound conducting hole coincides with or is parallel to a central axis of the first sound conducting hole.

18. The electronic component of claim 1, wherein a main axis of a sound receiving area of the second microphone element coincides with or is parallel to a main axis of a sound receiving area of the first microphone element.

19. An electronic device, comprising:
a glasses bracket, wherein the glasses bracket includes a glasses frame and two temples, each of the two temples including a temple body connected to the glasses frame, at least one of temple bodies of the two temples including an electronic component, the electronic component including:
  a component body including a container body and a cover, the container body being hollow to form a cavity, an opening in flow communication with the cavity is arranged in the container body, the cover being arranged on the opening and closes the cavity;
  a first microphone element arranged in the cavity;
  a second microphone element arranged in the cavity;
  a first sound conducting hole arranged on a first sidewall of the component body and configured to conduct a first sound originating from the sound source to the first microphone element; and
  a second sound conducting hole arranged on a second sidewall of the component body and configured to conduct a second sound originating from the sound source to the second microphone element.

20. The electronic device of claim 19, wherein
the each of the two temples further includes a connector that is hinged with, through a hinge, an end of the temple body away from the glasses frame;
the glasses further include a bone conductive loudspeaker, the bone conductive loudspeaker being arranged on the connector, wherein:
  the connector is configured to switch the bone conductive loudspeaker, relative to the temple body, between a first position and a second position, and attach the bone conductive loudspeaker on a back of an auricle of a user when the bone conductive loudspeaker is in the first position.

* * * * *